(12) United States Patent
Pasma

(10) Patent No.: US 12,428,824 B2
(45) Date of Patent: Sep. 30, 2025

(54) SMART ELECTRONIC FAUCET SYSTEM

(71) Applicant: ASSA ABLOY Americas Residential Inc., New Haven, CT (US)

(72) Inventor: Kevin Pasma, Lake Forest, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 23 days.

(21) Appl. No.: 18/263,574

(22) PCT Filed: Oct. 1, 2021

(86) PCT No.: PCT/US2021/053059
§ 371 (c)(1),
(2) Date: Jul. 31, 2023

(87) PCT Pub. No.: WO2022/072759
PCT Pub. Date: Apr. 7, 2022

(65) Prior Publication Data
US 2024/0117615 A1 Apr. 11, 2024

Related U.S. Application Data

(60) Provisional application No. 63/086,886, filed on Oct. 2, 2020.

(51) Int. Cl.
*E03C 1/05* (2006.01)
(52) U.S. Cl.
CPC .................................. *E03C 1/057* (2013.01)
(58) Field of Classification Search
CPC ......... E03C 1/057; E03C 1/055; G06Q 10/04; G06Q 50/10; G10L 15/30; G10L 15/32; G01F 3/167
See application file for complete search history.

(56) References Cited

U.S. PATENT DOCUMENTS 8,162,236 B2   4/2012   Rodenbeck et al.
9,194,110 B2   11/2015  Frick et al.
(Continued)

FOREIGN PATENT DOCUMENTS

CN    104238735    12/2014
CN    105179780    12/2015
(Continued)

OTHER PUBLICATIONS

International Search Report for PCT/US2021/053059, dated Jan. 19, 2022.
(Continued)

*Primary Examiner* — Patrick C Williams
(74) *Attorney, Agent, or Firm* — Merchant & Gould P.C.

(57) ABSTRACT

The disclosed smart electronic faucet system controls the flow of water being dispensed using voice commands. The disclosed smart electronic faucet system is a hybrid system that uses the computing resources available locally within the faucet itself for time-sensitive commands and the computing resources of a network connected server system or computing device for commands that do not have a time-sensitivity. After receiving a voice command, the disclosed smart electronic faucet system analyzes the command to determine if the command is time-sensitive and if so, uses computing resources located within the faucet to process the command to determine the control action to be taken by the faucet. Otherwise, the faucet sends the command to a server computer or computing device that is remotely located but communicatively connected to the faucet, which then processes the command and returns the control action to be taken by the faucet.

19 Claims, 22 Drawing Sheets

(56) References Cited

U.S. PATENT DOCUMENTS

| | | |
|---|---|---|
| 10,120,354 B1 | 11/2018 | Rolston |
| 10,937,421 B2 | 3/2021 | Beck et al. |
| 2001/0047262 A1 | 11/2001 | Kurganov et al. |
| 2004/0193326 A1 | 9/2004 | Phillips et al. |
| 2006/0186215 A1 | 8/2006 | Logan |
| 2009/0006099 A1 | 1/2009 | Sharpe et al. |
| 2011/0031331 A1 | 2/2011 | Klicpera |
| 2012/0017367 A1 | 1/2012 | Reeder et al. |
| 2012/0254810 A1 | 10/2012 | Heck et al. |
| 2012/0266983 A1 | 10/2012 | Tsai et al. |
| 2013/0325484 A1 | 12/2013 | Chakladar et al. |
| 2014/0092007 A1 | 4/2014 | Kim et al. |
| 2014/0163978 A1 | 6/2014 | Basye et al. |
| 2014/0195248 A1 | 7/2014 | Chung et al. |
| 2014/0261780 A1 | 9/2014 | Thomas et al. |
| 2015/0142704 A1 | 5/2015 | London |
| 2015/0262577 A1 | 9/2015 | Nomura |
| 2015/0308084 A1 | 10/2015 | Thompson et al. |
| 2015/0308089 A1 | 10/2015 | Thompson et al. |
| 2015/0322652 A1 | 11/2015 | Mazz et al. |
| 2015/0368887 A1 | 12/2015 | Esche et al. |
| 2016/0063989 A1 | 3/2016 | Deleeuw |
| 2016/0077530 A1 | 3/2016 | Moran et al. |
| 2016/0258144 A1* | 9/2016 | Tayenaka ............... G05D 27/02 |
| 2016/0289932 A1 | 10/2016 | Mirakhimov et al. |
| 2016/0328880 A1 | 11/2016 | Sajapuram et al. |
| 2016/0334807 A1 | 11/2016 | Song |
| 2017/0053651 A1 | 2/2017 | Lim |
| 2017/0186428 A1 | 6/2017 | Kunitake et al. |
| 2017/0254055 A1* | 9/2017 | Xia ........................ E03B 1/042 |
| 2017/0260722 A1* | 9/2017 | Horwitz ................. G01F 15/06 |
| 2017/0268208 A1 | 9/2017 | LaMarche |
| 2018/0216324 A1 | 8/2018 | Beck et al. |
| 2018/0216325 A1 | 8/2018 | Chen |
| 2018/0244541 A1 | 8/2018 | Pirutin |
| 2020/0123747 A1 | 4/2020 | Frackelton |
| 2020/0299941 A1 | 9/2020 | Veros et al. |
| 2020/0339438 A1 | 10/2020 | Lautzenheiser et al. |

FOREIGN PATENT DOCUMENTS

| | | |
|---|---|---|
| CN | 108779631 A | 11/2018 |
| CN | 109185504 A | 1/2019 |
| CN | 110392757 A | 10/2019 |
| CN | 111630230 A | 9/2020 |
| EP | 2843657 | 3/2015 |
| JP | 2020124691 A | 8/2020 |
| WO | 2016040986 | 3/2016 |

OTHER PUBLICATIONS

International Preliminary Report on Patentability for PCT/US2021/053059, dated Mar. 28, 2023.

* cited by examiner

SMART ELECTRONIC FAUCET SYSTEM

CROSS-REFERENCE TO RELATED APPLICATION

This application is a National Stage Application of PCT/US2021/053059 filed Oct. 1, 2021, which claims priority to U.S. Provisional Patent Application No. 63/086,886, filed Oct. 2, 2020; entitled SMART ELECTRONIC FAUCET SYSTEM, the disclosures of which are hereby incorporated by reference in their entireties. To the extent appropriate, a claim of priority is made to each of the above identified applications.

BACKGROUND

Faucets typically comprise mechanical parts to control the temperature and flow of water. In many situations, a mechanical valve controls the hot and cold water inlets through one or more faucet handles. Typically, a user manipulates the mechanical valve to adjust hot/cold mix and water flow by maneuvering faucet handle(s). However, users may be preoccupied with their hands and may not always be able to maneuver the handle in order to adjust the flow of water being dispensed by the faucet.

SUMMARY

Generally, the present disclosure relates to a smart electronic faucet system.

In one example aspect, a method for controlling water dispensed from a faucet in response to receiving a voice command is provided. The method includes: receiving at the faucet, a voice command associated with the operation of the faucet; comparing the received voice command to a list of one or more predetermined local commands to determine whether the voice command is one of the one or more predetermined local commands that is to be processed at the faucet for determining a control action or whether the voice command is not one of the one or more predetermined local commands and is to be communicated to a server for determining the control action remotely; upon determining that the received voice command includes at least one of the one or more predetermined local commands: analyzing the voice command at the faucet to determine a control action to be taken by the faucet in response to the voice command; and causing the faucet to perform the control action; upon determining that the received voice command does not include at least one of the one or more predetermined local commands: sending the voice command from the faucet to a server communicatively connected to the faucet; receiving a control action to be taken by the faucet from the server in response to the voice command; and causing the faucet to perform the control action.

In a second aspect, an electronic voice controlled faucet system is disclosed. The system includes: a faucet, including: a microphone configured to receive a voice command from a user; an electronic flow control system to adjust the flow of water being dispense by the faucet; and a controller including a processor and memory, the memory storing instructions that when executed by the processor cause the processor to: receive the voice command from the microphone; compare the received voice command to a to a list of one or more predetermined local commands; upon determining that the received voice command includes at least one of the one or more predetermined local commands: analyze the received voice command to identify a control action to be taken by the faucet in response to the voice command; and cause the electronic flow control system to adjust the flow of water being dispensed based on the identified control action associated with received voice command.

In a third aspect, a faucet is disclosed. The faucet includes: a controller including a processor and memory, the memory storing instructions that when executed by the processor cause the processor to: receive a voice command from a user through a microphone embedded within the faucet; compare the received voice command to a list of one or more predetermined local commands to determine whether the voice command is one of the one or more predetermined local commands that is to be processed at the faucet for determining a control action or whether the voice command is not one of the one or more predetermined local commands and is to be communicated to a remote server for determining the control action remotely; upon determining that the received voice command is one of the one or more predetermined local commands: analyze the received voice command to identify the control action to be taken by the faucet in response to the voice command; and cause an electronic flow control system associated with the faucet to adjust the flow of water being dispensed from the faucet based on the identified control action associated with received voice command.

DETAILED DESCRIPTION

Figure 1:
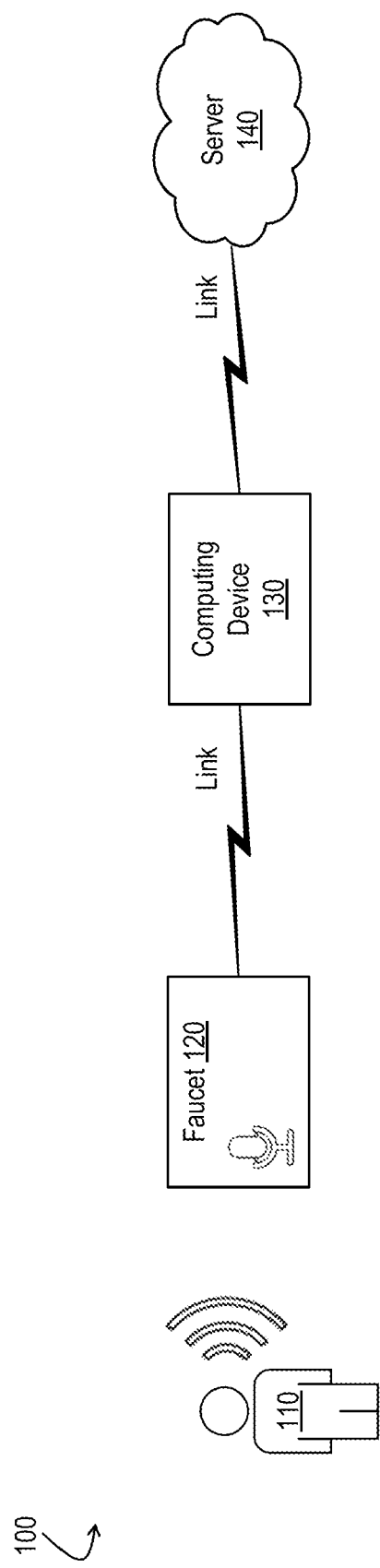
FIG. 1 illustrates an example smart electronic faucet system according to example embodiments of the present disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Typically, faucets include one or more handles or knobs that can be maneuvered to adjust the flow of water being dispensed from the faucet. However, users may be preoccupied with their hands or may be busy otherwise and may not always be able to physically maneuver the faucet handle (s) in order to control the flow of water. At least in the case of a kitchen faucet, some example situations where the user may prefer to control the water flow without physically adjusting the faucet handle include: the user's hands might be messy or covered in food and the user may not want to dirty up the faucet by touching it, the user may be trying to fill up a pot with water while occupied with another kitchen task and may want to turn off the flow of water without having to stop their current task, the user may want to change the temperature of the water while being occupied with both hands, etc. In addition to these situations, having control over the volume of water being dispensed, the duration of time that water is dispensed, the temperature of the water being dispensed, etc., can also be beneficial.

Although smart faucets that are connected to computing devices or servers that use voice recognition technology to control the flow of water being dispensed from the faucet currently exist, the delay in the transmission of control signals and data between the faucet and the remote server/computing device introduces large amounts of lag that makes the feature impractical in many cases. For example, a user trying to fill a pot with water may express a command such as "turn off faucet" when the water level in the pot is satisfactory. However, the time taken for a computing device (such as an Amazon Echo device) to receive the command, communicate the command to a server computer, receive the response from the server computer with the faucet control action, and send the control action to the faucet which then interprets the control action and executes it creates enough lag that the faucet may not stop the flow of water for several seconds. This delay may cause the pot to overfill and result in wastage. The severe, and at times unpredictable, lag created when using network connection to send and retrieve data between the faucet and a remote computing device/server makes such a system impractical to use for such circumstances.

In addition, processing all commands locally within the faucet is also impractical due to the size of memory and processing power needed by a computing device to interpret the user's language. A network connection is useful in accessing the Internet to recognize and interpret a user's command. Therefore, in example embodiments described herein, a hybrid system is provided that uses local computing resources for a short-list of time-sensitive commands as well as using the larger resources of a network connected server for commands with no time sensitivity may result in a more practical and useable smart faucet system.

For example, commands such as "turn faucet on" or "turn faucet off" may be time sensitive and be processed locally using the computing resources integrated within the faucet itself. Other commands such as "dispense 8 oz of water" or "dispense water for 30 seconds" may not have the same time sensitivities and can be delegated to being processed using computing resources that are remotely located and communicatively connected to the faucet. Additionally, commonly-used commands, and/or commands requiring little lag time, may be stored in, or updated within, computing resources that are local to the faucet, while seldom-used commands may be stored remotely. Accordingly, over time, the specific commands implemented locally at any given faucet may change, e.g., due to user preferences, ensuring low lag time for time-sensitive commands and/or frequently used commands, while preserving a large, extensible library of remote commands available for use as well.

In one embodiment, the smart electronic faucet system may receive a voice command from a user. Upon receiving the command the faucet may first determine whether command is time-sensitive. This determination can be made by comparing the received command to a database of time-sensitive commands that are locally stored within the faucet. If the received command matches one of the commands on the database of local commands, then the command is classified as a "local command" and the command is processed locally using the computing resources integrated to the faucet. If the received command does not match any of the commands on the database of local commands, then the command is classified as an "extensible command" and the command is transmitted to a computing device, such as an Internet of Things device or a server computer that is communicatively connected to the faucet through a network connection. The command is then processed at the remotely located computing device or server and the control action to be taken by the faucet is transmitted back to the faucet from the computing device or server.

FIG. 1 illustrates an example smart electronic faucet system 100. The smart electronic faucet system 100 includes a faucet 120 that is communicatively linked to a computing device 130, which in turn is communicatively connected to a server computer 140. The faucet 120 receives a voice command from a user 110 using a microphone associated with the faucet 120. Upon receiving the voice command, a controller associated with the faucet 120 analyzes the voice command for the presence of one or more key phrases. If the controller determines that the voice command includes a key phrase, then the operation of the faucet 120 is controlled based on the voice command. Alternatively, if the controller determines that the voice command does not include any key phrases, then the voice command may be transmitted to the computing device 130 via the communication link. The computing device 130 in turn may access the server computer 140 to determine what action to take based on the received voice command. The components associated with the smart electronic faucet system 100 are described in greater detail in relation to FIG. 2.

Figure 2:
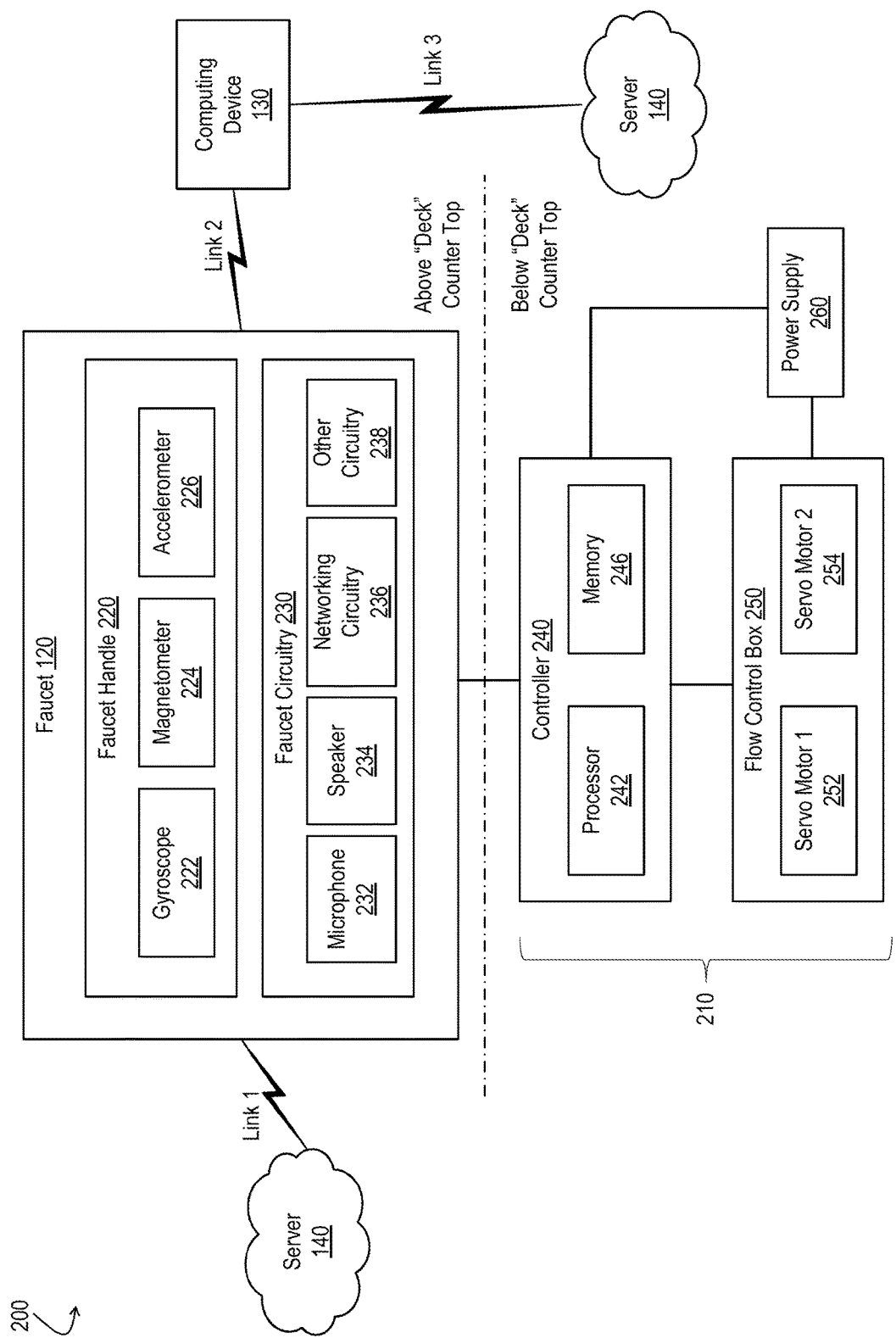
FIG. 2 illustrates an example smart electronic faucet system according to one possible embodiment.

FIG. 2 illustrates a detailed example 200 of the smart electronic faucet system 100. The faucet system 200 includes an electronic control system 210 for controlling dispensing of water from a faucet 120. In the example shown in FIG. 1, the control system 210 includes the controller 240 including a processor 242 to process the signals received from the faucet circuitry 230 to send a signal to the flow control box 250 and a memory 246 to store instructions to be executed by the processor 242. The control system also includes a power supply 260 that is connected to the controller 240 and the flow control box 250.

Figure 5:
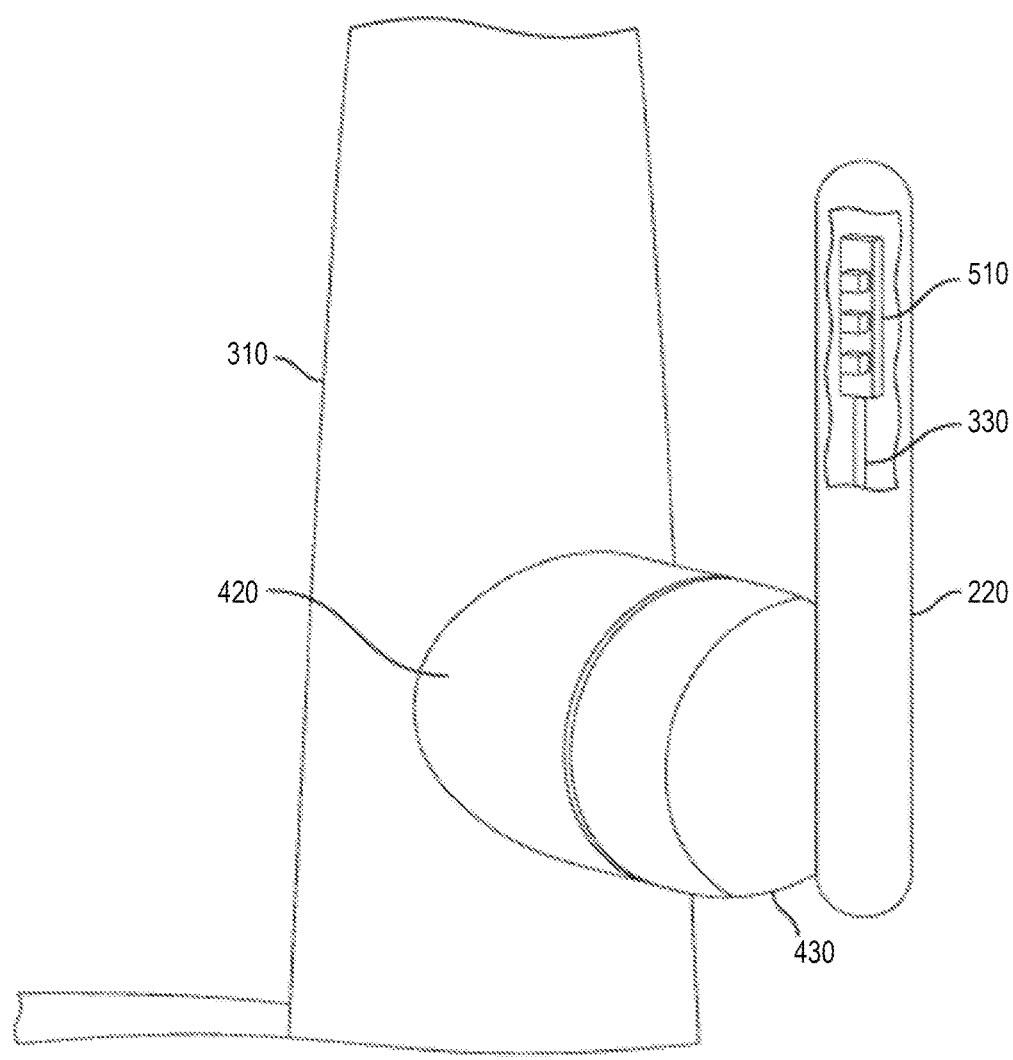
FIG. 5 illustrates an embodiment of a detailed view of the faucet handle.

In some embodiments, the control system 210 additionally or alternatively includes a faucet handle 220 as part of the faucet 120, wherein the faucet handle 220 receives inputs from at least one of a gyroscope 222, magnetometer 224, and accelerometer 226 of the sensor PCBA, described in relation to FIG. 5.

In one embodiment, the faucet handle 220 is located above the countertop and the controller 240, flow control box 250, and power supply 260 are located below the countertop. The components of the control system may be arranged above and below the counter top as appropriate. The power supply 260 provides power to the faucet handle 220 through the controller 240. In another embodiment, the power supply 260 may be connected directly to the faucet handle 220. The power supply 260 can be power supplied from an outlet and converted as necessary for use by the controller 240, flow control box 250, and faucet handle 220. The flow control box 250 may have a separate power supply 260 than the controller 240. The power supply 260 may be any power source to supply electrical power for the function of the faucet handle 220, controller 240, and the flow control box 250.

In one embodiment, the faucet handle 220 detects its spatial orientation through the use of at least one of the gyroscope 222, the magnetometer 224, and accelerometer 226. In another embodiment, the faucet handle 220 may use other sensors to detect its spatial orientation. The faucet handle 220 can send the signals received from the sensors 222, 224, 226 to the controller 240 to use an algorithm in order to determine the temperature of water and the flow rate of the water to be released from the spray head 320 (discussed in further detail in relation to FIG. 3A). In another embodiment, the controller 240 may use a look-up table to determine the temperature of water and the flow rate of the water to be released from the spray head 320. After determining the temperature and flow rate of the water, the controller 240 can send a signal to flow control box 250 to control the servo motor 1 252 and servo motor 2 254 to adjust the temperature and flow rate of the water being dispensed from the spray head 320. The flow control box 250 receives hot and cold water from the water supply inlet hoses 350 to output the water of a desired temperature and flow rate through the pull down hose 340 to the spray head 320.

In some embodiments, the faucet 120 may include faucet circuitry 230 that includes a microphone 232 that is voice-enabled and/or speakers 234. In other embodiments, the faucet circuitry 230 may also include networking circuitry 236 (e.g., Bluetooth, WiFi, mesh networking, ZigBee, etc.) such that the faucet 120 is communicatively coupled with other components. In yet other embodiments, the circuitry 230 may also include control circuitry (e.g., microcontrollers, processors, or other embedded systems), sensors and sensor circuitry (e.g., Inertial Motion Units or IMUs, flow, pressure, temperature, hall effect, etc.), or other circuitry 238.

In some embodiments, one or more components of the faucet circuitry 230 or the faucet circuitry 230 itself may be located within the faucet handle 220. In other embodiments, the one or more faucet circuitry 230 and/or the faucet circuitry 230 itself may be located in other regions of the faucet 120 such as the faucet body or other regions.

In some embodiments, the faucet 120 may additionally or alternatively be communicatively coupled (e.g., via Links 2 and 3) to a computing device 130 which is in turn communicatively coupled to a server 140 or cloud network service. In one embodiment, the faucet 120 may be communicatively coupled to a computing device 130 such as a commercially available consumer device (e.g., Internet of Things devices such as the Amazon Echo™ or the Google Home™). The computing device 130 may, in turn, be communicatively coupled to a server 140 (e.g., Amazon Web Servers), the Internet, or other computing devices. As described further with reference to FIG. 15, the faucet 120 may use the functionality of the computing device 130 (e.g., voice-recognition capabilities, network capabilities, programmable functionality, etc.) to boost its own functionality.

In some embodiments, after receiving a voice command from a user with a voice-enabled microphone 232 associated with the circuitry 230, the faucet 120 may communicate the voice command to the controller 240, where the stored instructions in the memory 246 help the processor 242 analyze the voice command and determine if the voice command includes one or more predetermined key phrases. If the processor 242 detects one or more key phrases within the voice command, then the voice command is further analyzed and the operation of the faucet 120 is controlled using the flow control box 250 in accordance with the received voice command.

In other embodiments, after receiving a voice command, the processor 242 may determine that the voice command does not include any of the predetermined key phrases. In such cases, the circuitry 230 communicates with other computing devices via a communication link, such as the Internet, or the circuitry 230 communicates with a server or another component (e.g., a networked computing device or a cloud network service) to determine what action to take based on the received voice command.

In some embodiments, the faucet 120 may have more than one microphone. For example, the microphones could be located adjacent to each other or at separate points on the faucet body. By way of example, the faucet may have one microphone on the front of the faucet body (sink facing) and another microphone on the back (backsplash facing). By way of another example, the faucet 120 may have a microphone on the front of the faucet body (sink facing) and another microphone on the top of the spout tube (ceiling facing). In another example, the microphone one or more microphone may be located on the faucet handle 220. Many variations of locations could be used depending on the circumstances.

The control system 210 also includes the flow control box 250, including a servo motor 1 252 and a servo motor 2 254 to control the water received from water supply inlet hoses 350 (not shown) to output water of a determined flow rate and determined temperature based upon the spatial orientation of the faucet handle 220. Servo motor 1 252 may be a servo motor for the control of cold water into the system. Servo motor 2 254 may be a servo motor for control of hot water into the system. In some embodiments, the flow control box 250 may use more than two servo motors in order to control the temperature and flow rate of the water. The flow control box 250 may also use a series of solenoids, needle valve, stepper motor, etc. in order to control the temperature and flow rate of the water depending on the circumstances.

In one embodiment, networking more than one faucet provides additional functionality and metrics. For example, a home may include more than one faucet with functionality described herein such that the household aggregate water consumption (and other metrics such as temperature, time, etc.) through faucets could be tracked. This data may benefit predictive metrics and save time and money. For example, a household might be able to better predict when and how much hot water is needed in order to only heat the amount of water needed at the correct time.

FIGS. 3A to 3E illustrate an example kitchen faucet according to different embodiments of the disclosure.

Figure 3A:
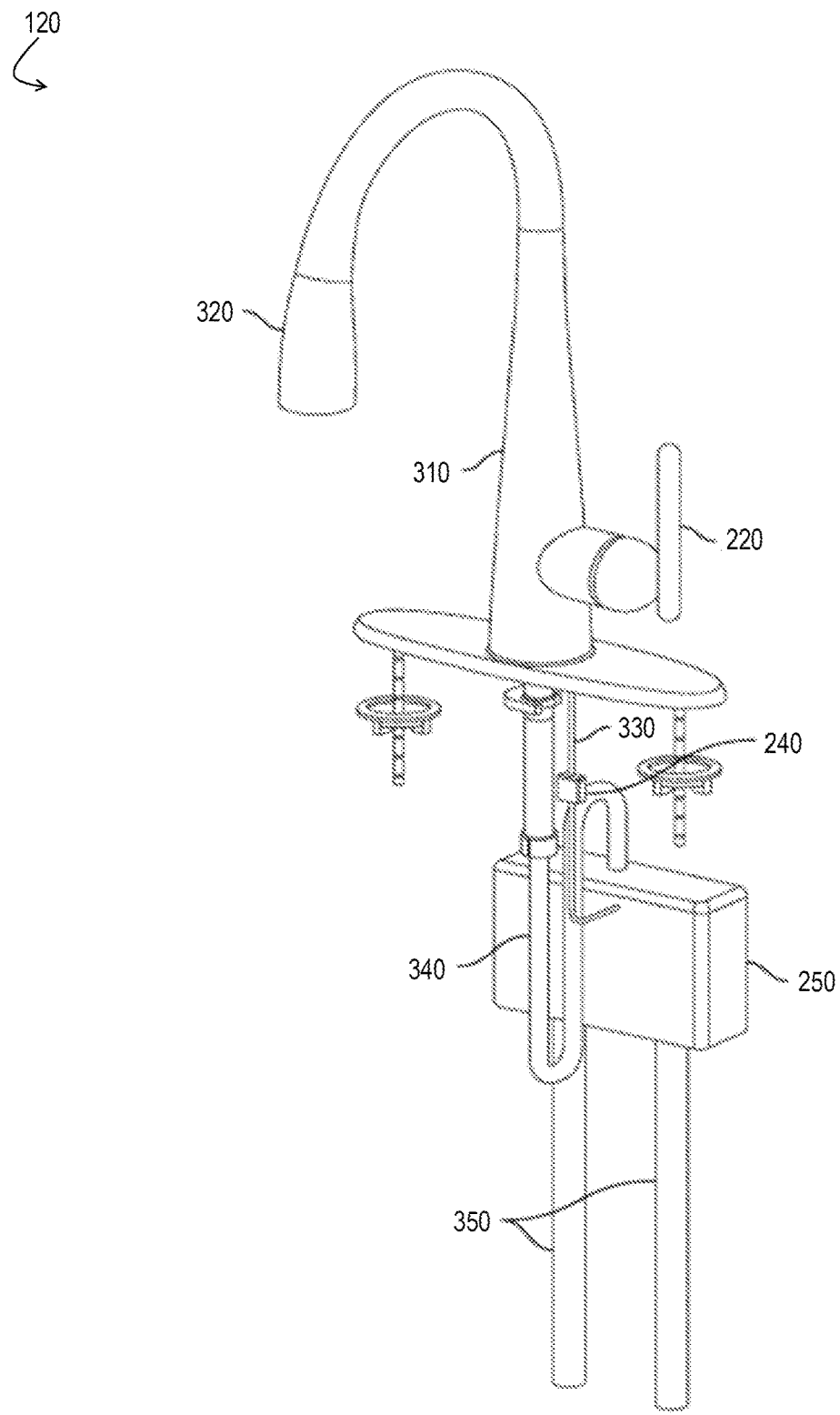
FIG. 3A illustrates a perspective view of an example faucet according to an embodiment of the disclosure.

FIG. 3A illustrates a perspective view of an example faucet 120 according to an embodiment of this disclosure. Although this disclosure will be discussed with regard to a kitchen faucet for purposes of example, the control system described herein could be implemented in any type of faucet, including bathroom faucets, whether the faucet has a single handle or two handles. Although the faucet 120 is shown as a pull-down kitchen faucet for purposes of example, this disclosure encompasses other types of faucets, including but not limited to pull-out faucets. In the example shown, the faucet 120 includes a faucet body 310, a faucet handle 220, and a spray head 320 that can be detached or undocked from the faucet body 310. The faucet body 310 can be shaped differently to provide a different connection with the faucet handle 220 or spray head 320. For example, in another embodiment the faucet body 310 could be flush with the faucet handle 220 to provide a more streamlined appearance that reduces the space required by the faucet 120. In another embodiment, the faucet handle 220 does not need to be connected to directly to the faucet body 310, but could be remote from the faucet body 310.

As shown, the faucet 120 can be manually controlled (e.g., the temperature, water flow, and on/off) using the handle 220. In some cases, the faucet 120 could be manually adjusted electronically, such as using a hands-free sensor, touch activation, buttons or other interface. As discussed more below, the handle 220 can detect its spatial orientation and send signals to a controller 240 to control water flow using a flow control box 250 through signal wires 330.

As discussed further herein, the faucet 120 can also be electronically controlled using voice and/or speech control. The terms "voice control" and "voice recognition" are used interchangeably to mean broadly a feature of the faucet for identifying a user based on a user's spoken words. With respect to voice recognition, for example, the faucet could have user-based presets for temperature, flow, volume, filtering, and/or other faucet controls based on an identification of the user using voice recognition. In one embodiment, for example, the faucet could have a user-based preset for a volume dispensed for a container of water. For example, a first user could have a 20-ounce preset in response to a command to "Dispense water into my tumbler" while a second user could have a 32-ounce preset for the same command. The faucet could include voice recognition to identify which user stated the command and dispense a volume of water consistent with that user's preset. The faucet 120 could also include speech recognition to parse a user's spoken words into a command to be executed by the faucet. For example, the faucet's speech recognition could interpret between commands "Dispense 8 ounces of water" and "Dispense water at 150 degrees." In some cases, voice recognition and speech recognition could be used in tandem. For example, the faucet could use voice recognition to understand a preset volume for the command "Dispense water into my tea cup" while speech recognition would parse the spoken words into a command recognizable by the faucet. Throughout the specification, the examples may describe only voice recognition or only speech recognition for purposes of simplifying the disclosure, but it should be appreciated that the faucet could include both voice recognition and speech recognition in each of these examples depending on the circumstances.

In the embodiment shown in FIG. 3A, the flow control box 250 is connected to a pull down hose 340 to provide fluid communication from water supply inlet hoses 350 to spray head 320. As is typical, the water supply inlet hoses 350 can supply cold and hot water to be released from the spray head 320.

Figure 3B:
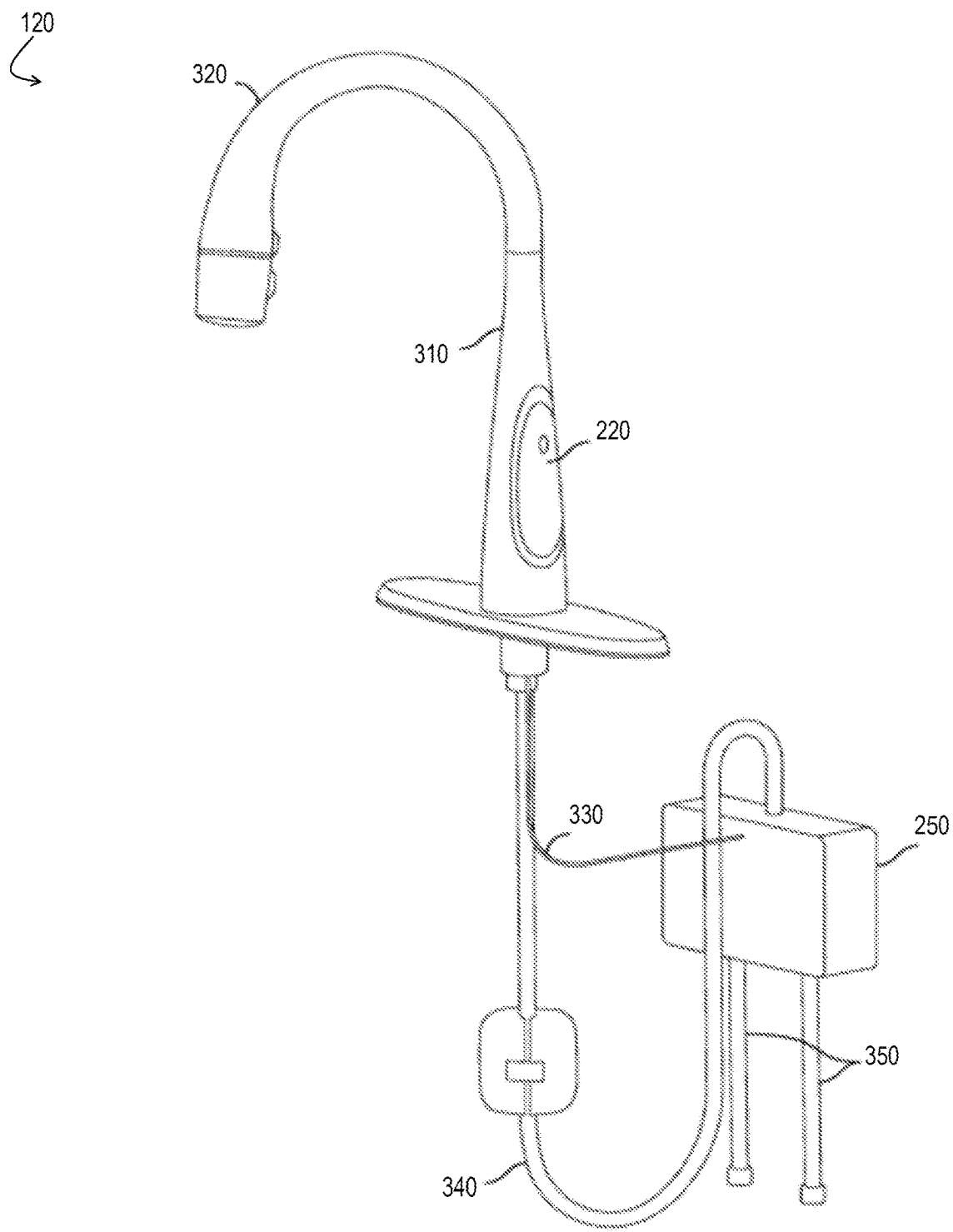
FIG. 3B illustrates a perspective view of an example faucet according to an embodiment of the disclosure.
Figure 3C:
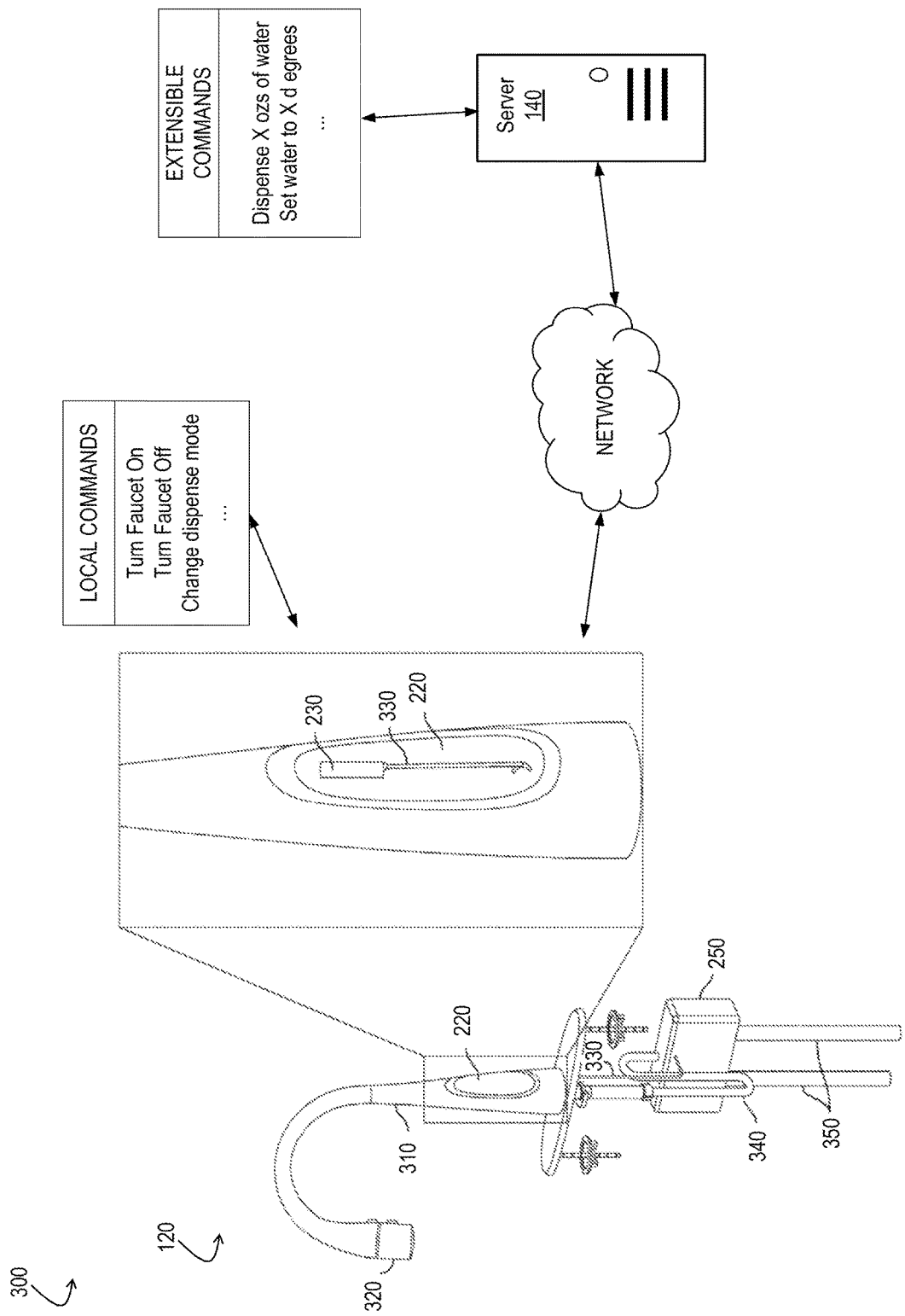
FIG. 3C illustrates a perspective view of an example smart electronic faucet system including the faucet of FIG. 3B further illustrating an exploded view of the faucet handle.

FIG. 3B illustrates a perspective view of an example faucet according to an embodiment of the disclosure. FIG. 3C illustrates a perspective view of an example smart electronic faucet system 300 including the faucet of FIG. 3B further illustrating an exploded view of the faucet handle.

In the example shown in FIGS. 3B and 3C, the faucet 120 includes a faucet body 310, a faucet handle 220, and a spray head 320 that can be detached or undocked from the faucet body 310. The faucet handle 220 may be substantially or fully integrated into the faucet body 310. The handle 220 may detect its spatial orientation and send signals to a controller 240 to control water flow using a flow control box 250 through signal wires 330. Additionally or alternatively, as shown in the cut-out portion of the faucet handle 220, the faucet 120 may include circuitry 230, such as control circuitry (e.g., microcontrollers, processors, or other embedded systems), networking circuitry 236, sensors and sensor circuitry (e.g., IMUs, microphones 232, speakers 234, flow, pressure, temperature, hall effect, etc.), or other circuitry 238. The circuitry 230 may be coupled to the signal wire 330 that in turn may be coupled to the controller 240 or other control circuitry.

Referring back to FIG. 2, the faucet 120 is communicatively connected to a server 140 through a network. In some examples the faucet 120 may be directly connected to the server 140 through a network. In other examples the faucet 120 may be communicatively connected to a computing device 130 first. For example, the computing device 130 can include commercially available consumer device (e.g., the Amazon Echo™ or the Google Home™). The computing device 130 may, in turn, be communicatively coupled to a server 140 (e.g., Amazon Web Servers), the Internet, or other computing devices. In some cases, the faucet 120 may use the functionality of the computing device 130 (e.g., voice-recognition capabilities, network capabilities, programmable functionality, etc.) to boost its own functionality.

In some embodiments, the faucet 120 receives a voice command from a user 110. The faucet 120 receives the voice command using a microphone 232 or another device capable of receiving voice commands. In some embodiments the microphone 232 is built into the faucet handle 220. In other embodiments, the microphone may be located in other regions of the faucet 120 including the faucet body 310. Upon receiving the voice command, the faucet 120 uses a processor to analyze the voice command.

In some cases, the faucet 120 may be controlled by speaking to it with set voice commands, which may be initiated by a predetermined and recognized voice trigger, such as "Faucet," "Computer," etc. The microphone 232, along with a microcontroller circuit or a processing unit located within the faucet 120 and to which the microphone is communicatively connected, constantly or periodically, listens for voice triggers. Upon hearing the trigger word, the microphone 232 is activated to record any words or phrases following the trigger word, which form the voice command.

In some embodiments, the voice command may include one or more control actions that the user wants the faucet 120 to perform. Control actions described herein are not meant to be limiting and include, for example, turning the water flow on and off, adjusting the flow, temperature, rate, volume, and duration of water being dispensed by the faucet. It is noted that the control action examples and voice triggers discussed above are intended as exemplary rather than limiting. For example, in association with faucet actuation control actions, one or more safety action could also be included. For example, in some cases where a control action includes actuating or opening a faucet valve to dispense water, a further control action can be preset to occur, such as to turn off or close the faucet within a predetermined amount of time or based on sensing a condition (e.g., water rising above a predetermined level) detected by sensors surrounding the faucet. Still further, other safety checks can be included in control actions, e.g., to determine a proximity of the user before dispensing water, or to adjust water flow gradually over time, such that a water flow rate tapers off near an end of a dispensing control action.

In some embodiments, the processor used to analyze the voice command may include the processor 242 located within the controller 240. In such cases, the voice command is transmitted to the processor 242 included in the controller 240 using the signal wires 330. The processor 242, using the instructions stored in memory 246, analyzes the voice command for the presence of one or more key words or phrases. In other embodiments, the processor used to analyze the voice command is a microcontroller circuit that may be included among the faucet circuitry 230. In such cases, the voice command is received by the microphone 232 and transmitted to the microcontroller circuit included among the faucet circuitry 230. The microcontroller circuit analyzes the voice command for the presence of one or more key words or phrases. Other types of processing units in other locations associated with the faucet can also be used to analyze a received voice command.

In some embodiments, the analysis of the voice command includes a determination if the voice command can be processed locally, meaning within the faucet or circuitry proximate thereto, or if the voice command can be processed remotely using the server 140 or computing system 130. The determination is based on an analysis of the words or phrases included in the voice command. For example, the voice command is parsed and a determination is made if the words or phrases included in the voice command is one of a list of predetermined words or phrases. If the voice command includes one or more key words or phrases, then the voice command is classified as a local command and the voice command is processed locally within the faucet 120 itself. On the other hand, if the voice command does not include any of the list of predetermined key words of phrases then the voice command is classified as an extensible command and the voice command is transmitted to the server 140 or the computing device 130 for further processing. In such cases, the computing device 130 or the server 140 further processes the voice command and transmits one or more instructions regarding what action to take back to the faucet 120 for the faucet to follow.

In some embodiments, any action taken by the faucet 120 that requires shortened time delays are typically executed locally in order to avoid longer time delays associated with transmitting and receiving instructions from remote servers and/or computing devices. For example, commands to turn faucet on and off or to change the dispense mode of the faucet may require immediate action from the faucet. Therefore, commands such as "turn faucet on," "turn faucet off," "change dispense mode," etc., may be included in the list of predetermined key words and phrases. On the other hand, a command to dispense a certain amount of water or changing the water to a certain temperature may be better tolerable to time delays. Therefore, commands such as "dispense . . . oz of water" or "set water to . . . degrees," etc., may not be included in the list of predetermined key words and phrases.

In some embodiments, the list of predetermined key words or phrases that trigger local action can be saved in the memory 246 or in the microcontroller circuit that may be included in the faucet circuitry 230. The list of predetermined key words or phrases can be updated over time using networking circuitry 236, for example, either manually by a user selecting specific commands, or automatically based on frequency of use of particular commands.

Figure 3D:
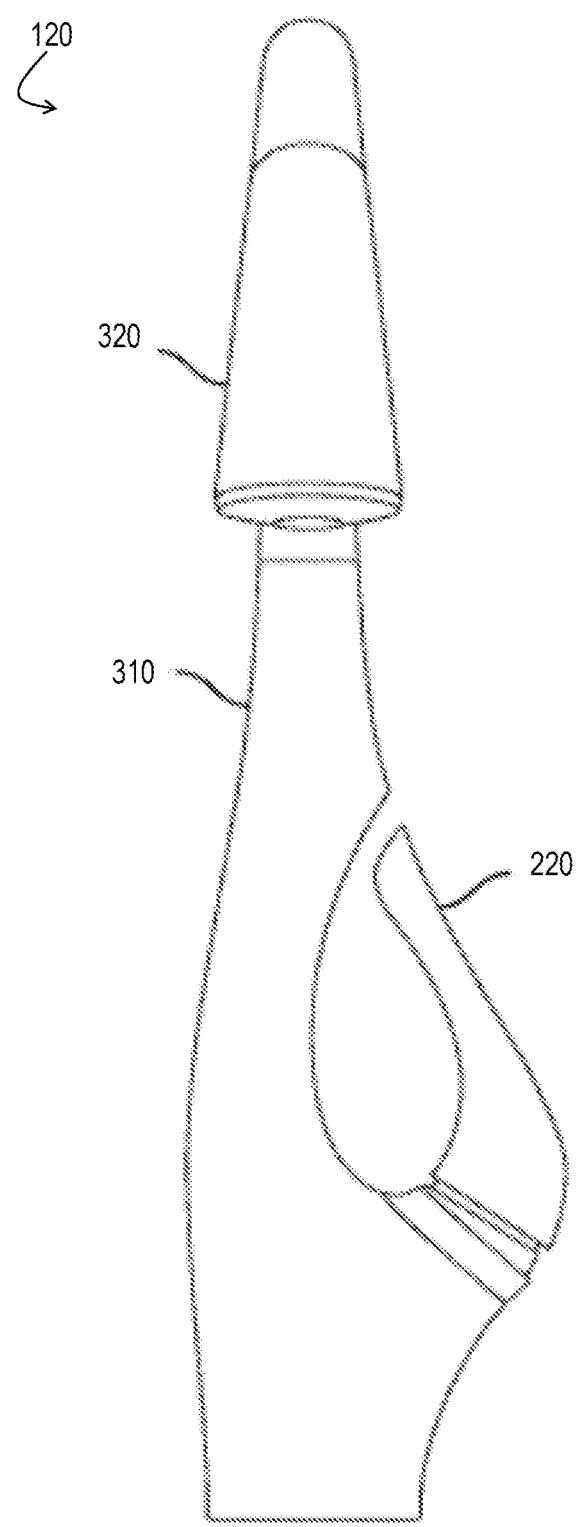
FIG. 3D is a front view of an example faucet according to an embodiment of the disclosure.

FIG. 3D is a front view of an example faucet according to an embodiment of the disclosure. In the example shown in FIG. 3D, the faucet 120 includes a faucet body 310, a faucet handle 220, and a spray head 320 that can be detached or undocked from the faucet body 310.

Figure 3E:
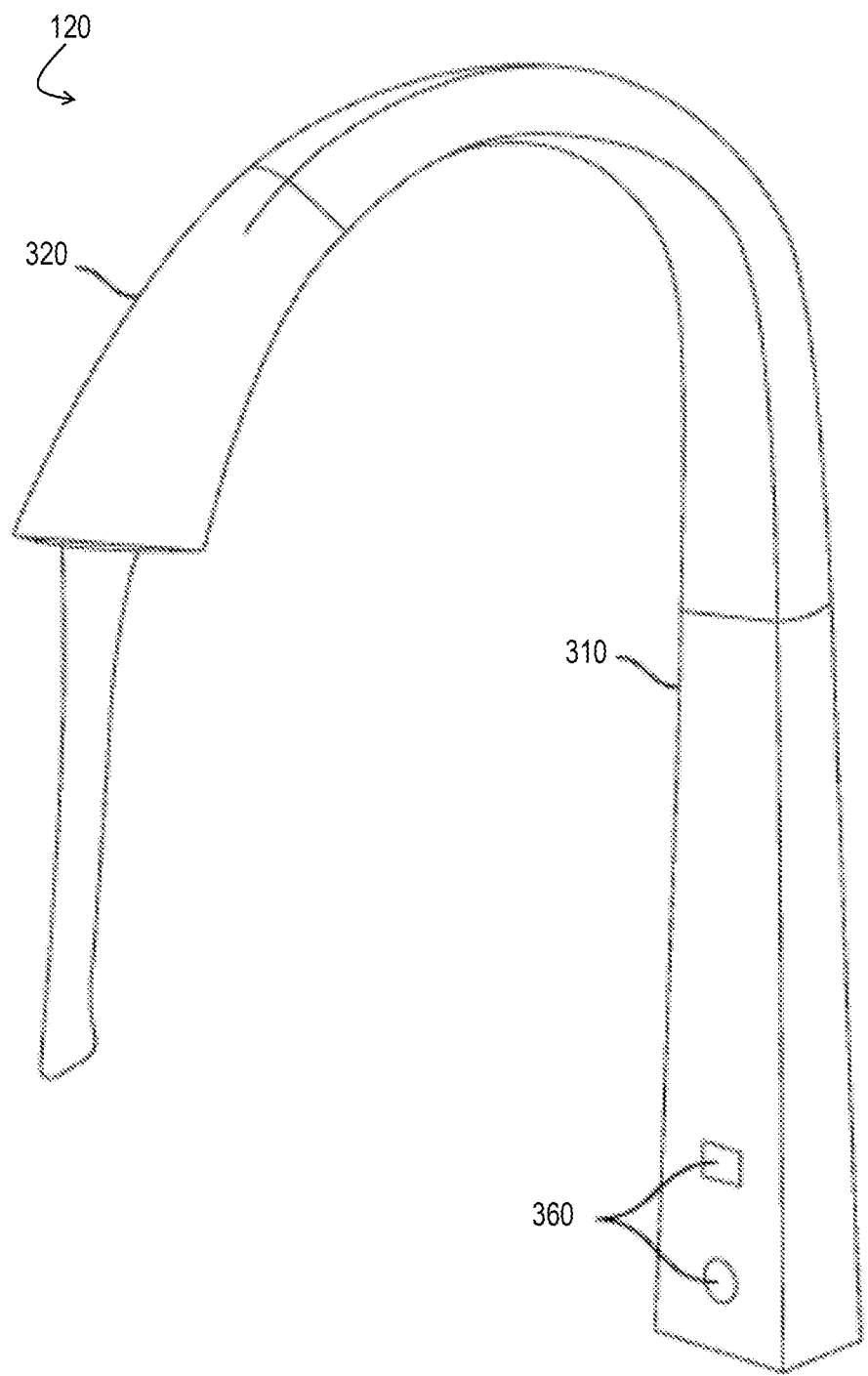
FIG. 3E is a perspective view of an example voice-controlled kitchen faucet according to an embodiment of the disclosure.

FIG. 3E is a perspective view of an example voice-controlled kitchen faucet according to an embodiment of the disclosure. In the example shown in FIG. 3E, the faucet 120 includes a faucet body 310, a spray head 320 that can be detached or undocked from the faucet body 310, and an interface 360. In some embodiments like the example shown in FIG. 3E, the faucet 120 does not include a faucet handle 220 because it is otherwise controlled (e.g., via voice commands). In some embodiments, the interface 360 is integrated within the faucet body 310. FIG. 3E illustrates an interface 360 with two icons (a sink icon and a logo icon) illuminated for purposes of example. When the interface 360 is not illuminating icons, the faucet body 310 may appear to be a single integrated piece without any interface 360. Thus, the interface 360 may be seen only when one or more portions of the interface 360 are illuminated or otherwise actuated. As an example, the faucet body 310 may look like a single piece of brushed chrome when the interface 360 is not illuminated or actuated. In some embodiments (e.g., when the faucet 120 receives a command or voice command), an LED may be illuminated on the interface 360 and light may show through the faucet body 310 (e.g., in the shape of an icon) like a one-way screen.

Figure 4:
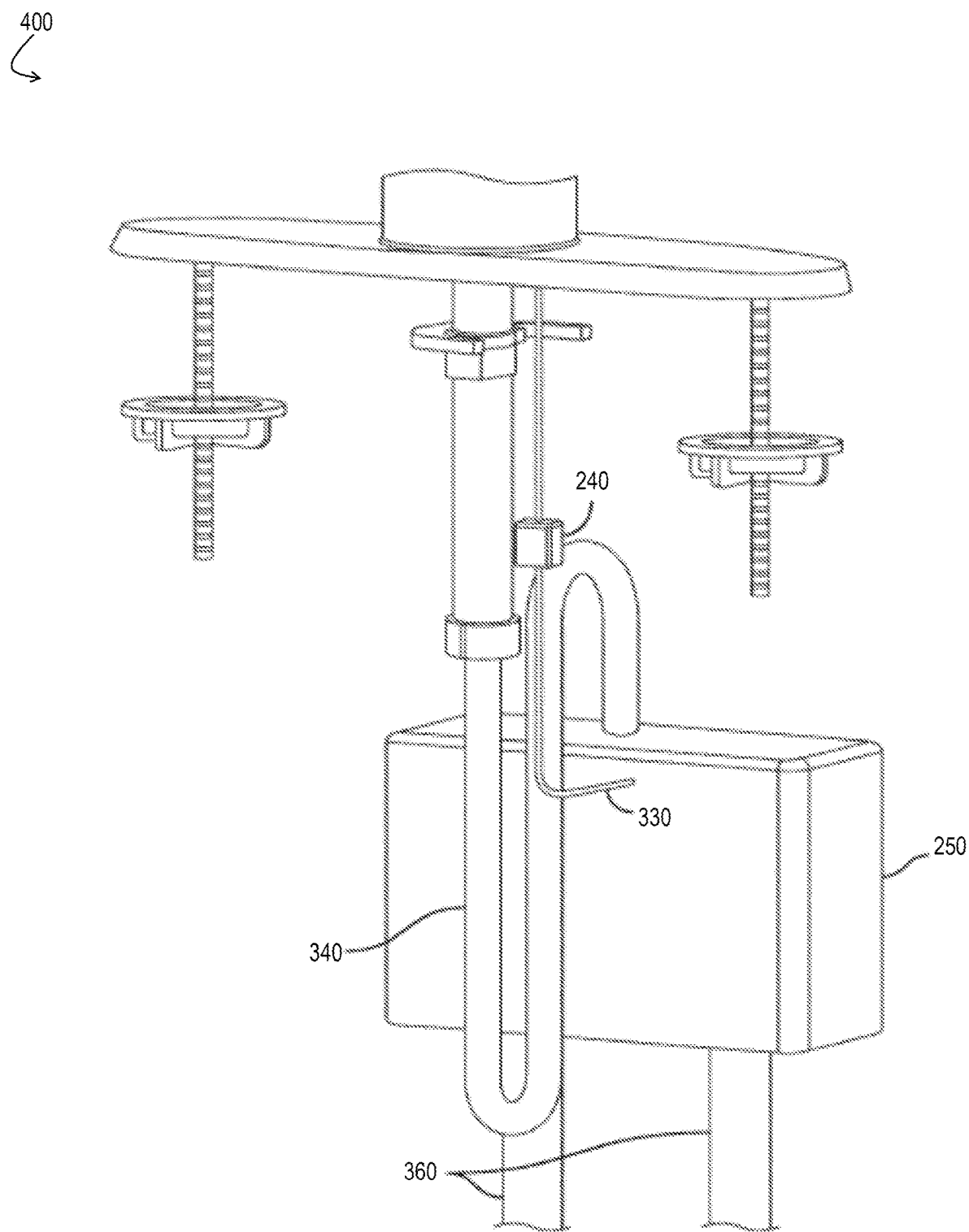
FIG. 4 illustrates an embodiment of a close up look at the components of the faucet under the counter top.

FIG. 4 illustrates an embodiment 400 of a close up look at the components of the faucet 120 under the counter top (not shown). As mentioned above, in one embodiment the controller 240 is connected to the flow control box 250 through signal wires 330 to analyze the signals to send from faucet handle 220 to control the flow of water from the water supply inlet hoses 350. The flow control box 250 can mix the water from water supply inlet hoses 350 to provide a water flow of a user-selected temperature to be released from the spray head 320. The flow control box 250 as shown is located under the counter top of the faucet 120. The flow control box 250 can be located elsewhere as appropriate to receive signals from controller 240 through signal wires 330 and provide water to be released from spray head 320 through pull down hose 340. The flow control box 250 can be located in a different position to provide more space underneath the counter top of faucet 120 depending on the circumstances.

In the example shown, the controller 240 is located outside of the flow control box 250. In another embodiment, the controller 240 can also be located inside of the flow control box 250. In another embodiment, the controller 240 can be located above the counter top of the faucet 120. The controller 240 could also be located inside the faucet handle 220.

The connection between the faucet handle 220, controller 240, and flow control box 250 is shown as a wired connection through signal wires 330. In another embodiment, the communication between the faucet handle 220, controller 240, interface 360, and/or flow control box 250 can be done wirelessly.

FIG. 5 illustrates an embodiment 500 of a closer look at the faucet handle 220. In some embodiments, the faucet handle can be used to control the flow of water without using the voice command. In other embodiments, the voice command can be used to control the flow of water being dispensed by the faucet 120 without adjusting the faucet handle 220.

The embodiment shown in FIG. 5 describes the faucet handle 220 and how the handle 220 can be adjusted to control the flow of water. The handle 220 shown in FIG. 5 includes a cut away to reveal the components inside of the faucet handle 220. In the example shown, the faucet handle 220 includes a sensor printed circuit board assembly (PCBA) 510 connected to the signal wire 330. As shown, the faucet handle 220 is connected to the faucet body 310 through a stationary faucet handle mount 520 in conjunction with a movable faucet handle mount 530. The stationary faucet handle mount 520 is connected to the faucet body 310. The stationary faucet handle mount 520 can be a part of the faucet body 310. The movable faucet handle mount 530 is movably connected to the stationary faucet handle mount 32. The movable faucet handle mount 530 is also connected to the faucet handle 220. The movable faucet handle mount 530 can be a part of the faucet handle 220. The connection between the stationary faucet handle mount 520 and the movable faucet handle mount 530 allows the faucet handle 220 to move at least rotationally along two axes of rotation. In one embodiment, one axis of rotation can represent the water flow being released from the spray head 320, and the other axis of rotation can represent the temperature of water being released from the spray head 320. Although the stationary faucet handle mount 520 and the movable faucet handle mount 530 extend from the faucet body 310 in the example shown, these components could be integral with the faucet body 310 to provide more flexibility for shape and size of the faucet body 310.

In one embodiment, the faucet handle 220 can be movably connected to the faucet body 310 without the stationary faucet handle mount 520 and the movable faucet handle mount 530. The faucet handle 220 can also be movably connected to the spray head 320. As discussed above, the faucet handle 220 can be separate from the faucet body 310 altogether and be movably connected to a surface for movement along two axes of rotation.

In some embodiments, the sensor PCBA 30 is configured to detect the spatial orientation of the faucet handle 220. In one embodiment, the sensor PCBA 510 is an inertial motion unit (IMU) sensor 510. The sensor PCBA 510 can send signals through signal wires 330 to controller 240 to interpret the signals. After the controller 240 determines a spatial orientation of the faucet handle 220 through the signals provided from sensor PCBA 510, the controller 240 can send signals to the flow control box 250 and control the water temperature and the water flow to be released from the spray head 320.

When the flow of water is adjusted using the voice command rather than the position of the faucet handle 220, the received voice command is analyzed according the process described further in relation to FIG. 2 and the processor 242 converts the identified control action to signals to send to the flow control box 250 to control the flow of water. For example, the processor 242 may convert a control action to "set the water temperature to 100 degrees" to a signal to the flow control box 250 in the same manner that a signal from the sensor PCBA that the faucet handle has been set to hot is converted to a signal to the flow control box 250 described above.

Figure 6:
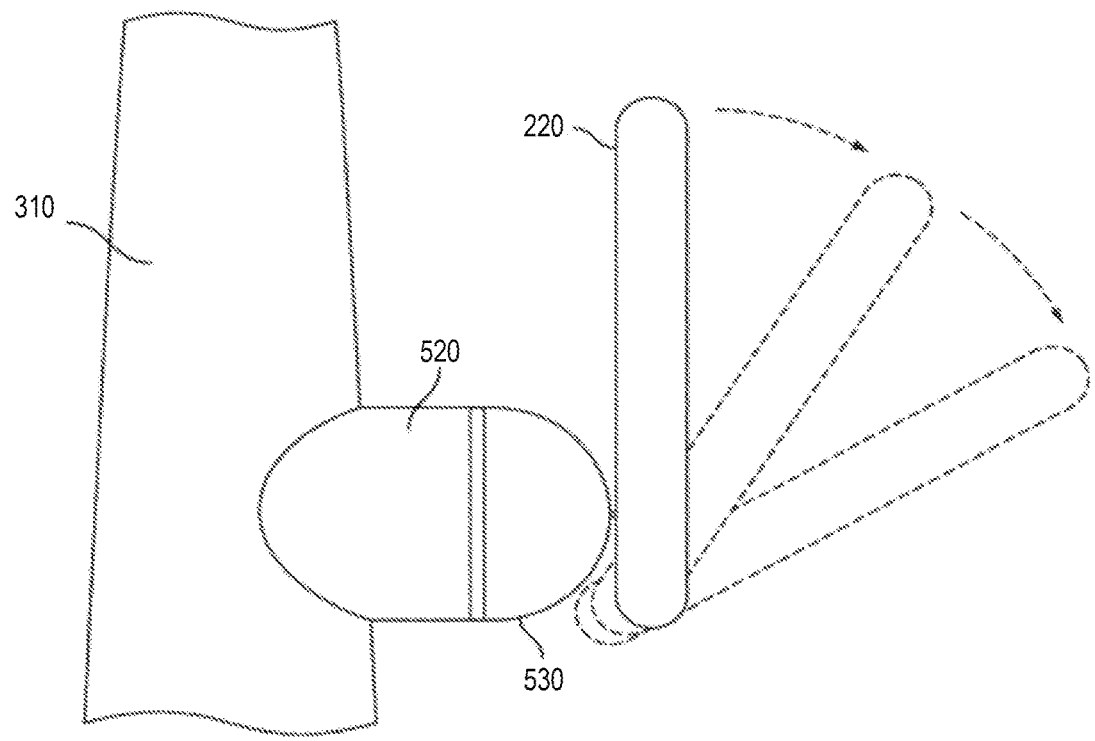
FIG. 6 illustrates a front view of the faucet handle showing the degrees of rotation that the faucet handle can travel along one axis of the faucet handle according to an embodiment of the disclosure.

FIG. 6 illustrates an example progressive movement 600 of the faucet handle 220 from an initial position where no water is being released to a fully extended position where the flow rate of water is at a maximum. In the example shown, the faucet body 310 is connected to the stationary faucet handle mount 520. The movable faucet handle mount 530 is movably connected to the stationary faucet handle mount 520. The faucet handle 220 is connected to the movable faucet handle mount 530 so a user can maneuver the faucet handle 220 along one axis as shown in relation to the faucet body 310.

In the shown embodiment, there are three different positions as the faucet handle 220 starts from an initial position rotating all the way to the fully extended position in phantom. In another embodiment, there may be a plurality of positions that the faucet handle 220 can achieve between an initial positions to a fully extended position. In one embodiment, as the faucet handle 220 is rotated in the way shown in FIG. 6, the faucet handle 220 sends signals to the controller 240 to control the flow control box 250 to release more water of a temperature determined as discussed below. In one embodiment, the faucet 120 does not release any water when the faucet handle 220 is in the initial position. The faucet 120 begins to release water of variable amounts when the faucet handle 220 is rotated from the initial position depending on the position of the faucet handle 220. The sensor PCBA 30 detects the position using the gyroscope 222, the magnetometer 48, and/or the accelerometer 226 and sends signals to the controller 240 to determine how much water is to be released. The controller 240 then sends a signal to the flow control box 250 to release water of a determined flow rate out of the pull down hose 340 to the spray head 320 through the use of the servo motors 252, 254.

Figure 7:
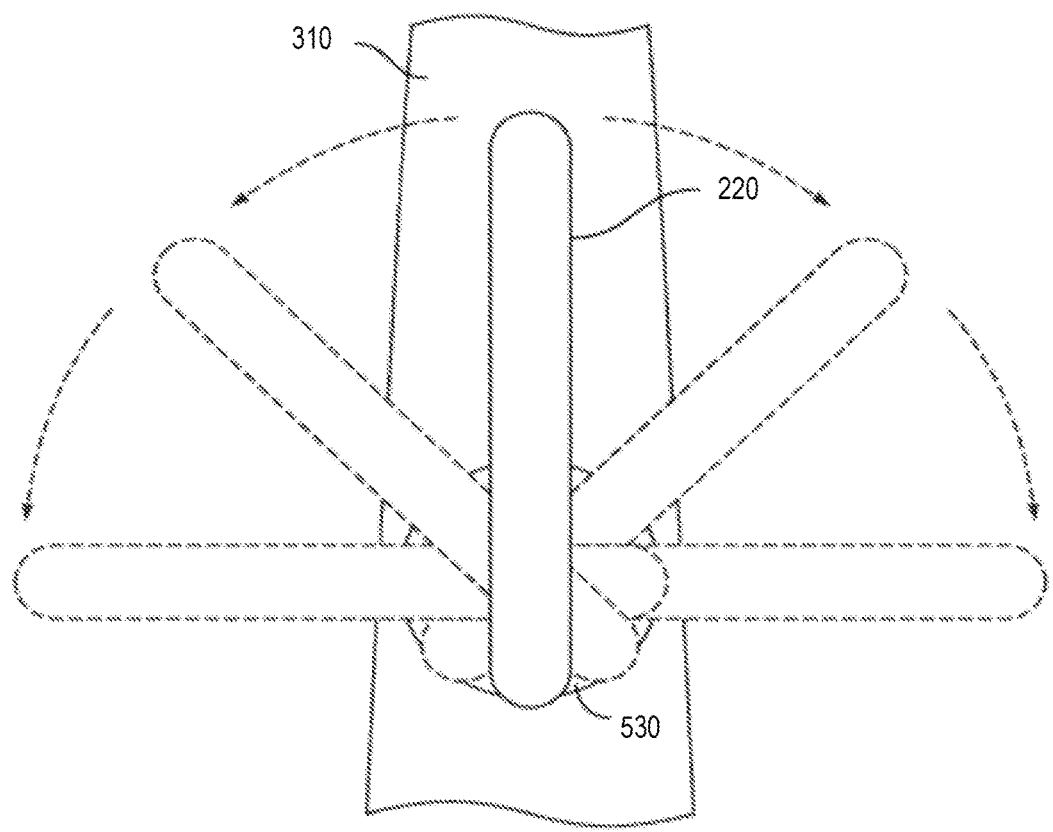
FIG. 7 illustrates a side view of the faucet handle showing the degrees of rotation that the faucet handle can travel along another axis of the faucet handle according to an embodiment of the disclosure.

FIG. 7 illustrates an example rotation 700 of the faucet handle 220 from an initial position to one side and from the initial position to the other side. In the example shown, the faucet handle 220 is connected to the movable faucet handle mount 530 that connects to the stationary faucet handle mount 520, discussed in relation to FIG. 5, which is connected to the faucet body 310. The connections allow the faucet handle 220 to rotate as shown. There is one initial position of the faucet handle 220 and four other positions shown in phantom. In another embodiment, there is a plurality of positions that the faucet handle 220 can achieve between the fully extended left position to the fully extended right position.

In one embodiment, as the faucet handle 220 is rotated along the axis of rotation the temperature of water the flow control box 250 releases to the pull down hose 340 connected to the spray head 320 changes. The faucet handle 220 detects its position using the sensor PCBA 510 and sends a signal to the controller 240. The controller 240 determines a temperature of the water to be released from the spray head 320 depending on the spatial orientation of the faucet and sends a signal to the flow control box 250 to output water of a certain temperature and flow rate through the pull down hose 340 to the spray head 320 as discussed above. The flow control box 250 can control the servo motors 252, 254 to release a specific amount of cold and hot water from the water supply inlet hoses 350 to achieve the desired temperature for the water released from the pull down hose 340 to the spray head 320.

In one embodiment, the fully extended left position of the faucet handle 220 could be for the release of the hottest water available. The fully extended right position of the faucet handle 220 can be for the release of the coldest water available. The initial position of the faucet handle 220 can be for the release of an even mix of hot and cold water available. The positions in between the fully extended left position of the faucet handle 220 and the fully extended right position of the faucet handle 220 can be varying mixes of hot and cold water to achieve relatively cold water or relatively hot water. The water can become progressively colder or hotter depending on which direction the faucet handle 220 is rotating towards. In another embodiment, the cold and hot directions may be switched so the fully extended left position of the faucet handle 220 can be for the release of the coldest water available and the fully extended right position of the faucet handle 220 can be for the release of the hottest water available.

Figure 8:
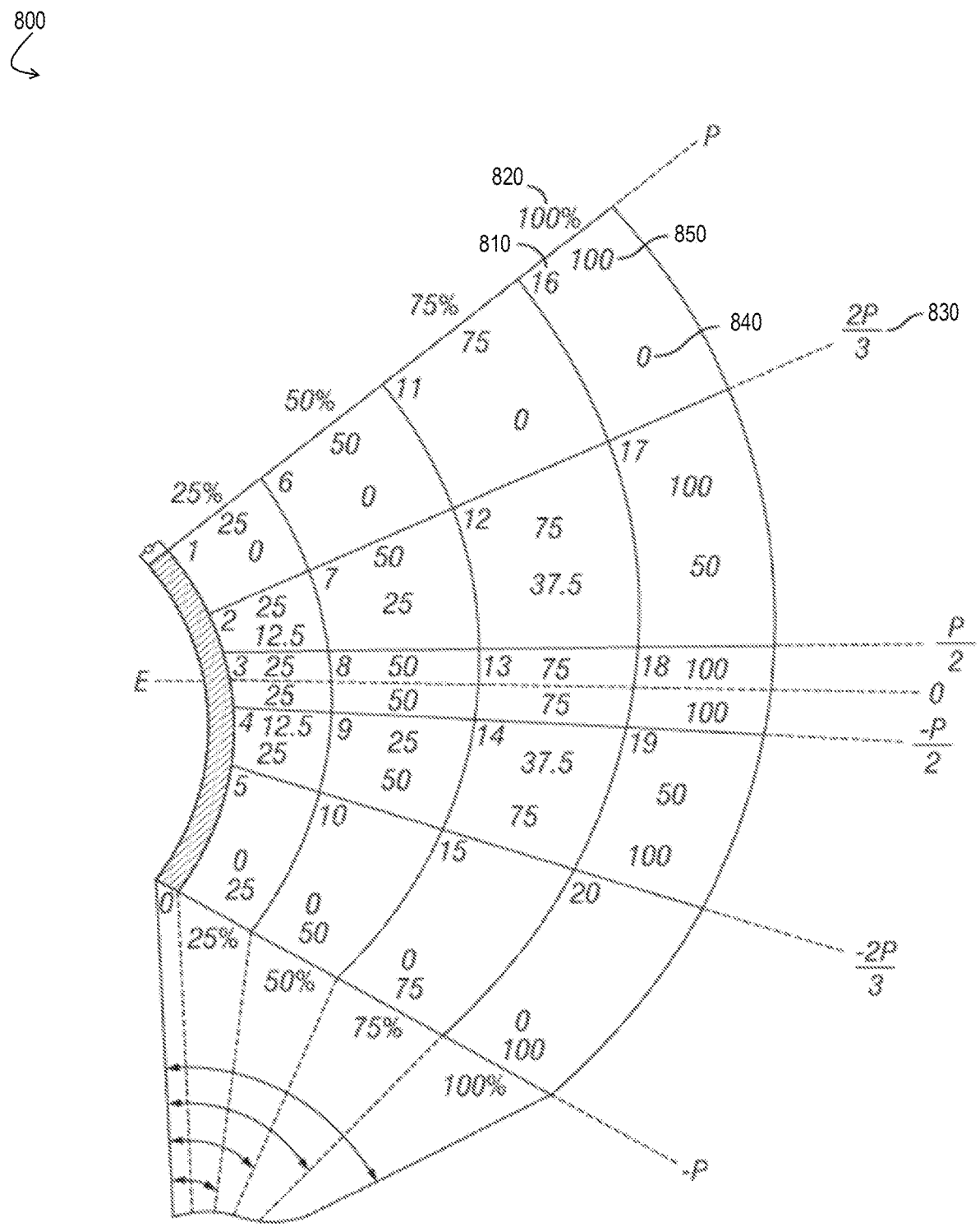
FIG. 8 illustrates a simplified diagram of water values released from two water supply inlet hoses given a position of the faucet handle according to an embodiment of the disclosure.

FIG. 8 illustrates a table 800 showing an example distribution of water from water supply inlet hoses 350 released through flow control box 250. The table covers the range of motion available for the faucet handle 220. The sections are labeled with section numbers 810 and are located along a spectrum of percentage water flow 820 and a temperature turn value 830. The sections further include a value for the servo motor 1 water inlet 840 and a value for the servo motor 2 water inlet 850. In one embodiment, the value for the servo motor 1 water inlet 840 can represent the cold water value and the value for the servo motor 2 water inlet 850 can represent the hot water value. In another embodiment, the servo motor water inlet 840, 850 values may be switched so that the value for servo motor 1 water inlet 840 represents the hot water value and the value for servo motor 2 water inlet 850 represents the cold water value. In the shown example, the percentage of water flow 820 ranges from 0 to 100% with four divisions. In one embodiment, the percentage of water flow 820 can be 25%, 50%, 75%, and 100%. In another embodiment, the percentage of water flow 820 may be divided in any way between 0 to 100%.

The temperature turn value 830 can represent the amount of rotation that is achieved for the faucet handle 220. For example, P can represent the fully extended right position of the faucet handle 220 and P can represent the fully extended left position of the faucet handle 220. In another embodiment, the positions may be switched so P can represent the fully extended left position of the faucet handle 220 and -P can represent the fully extended right position of the faucet handle 220. In the shown example, there are five divisions along the spectrum of temperature turn values 830. In another embodiment, there may be any number of divisions. In another embodiment, P may be divided into quarters and sixths. The temperature turn value 830 can be divided into a plurality of division.

The table is divided into several sections as shown in FIG. 8. Each section represents a location the faucet handle 220 can be located during operation. If the faucet handle 220 is located within one of the sections then the faucet 120 would release water according to the values 840, 850 within the section. For example, if the faucet handle 220 has been extended between 75% to 100% of the percentage of water flow 820 and the faucet handle 220 has been turned to a value between 2P/3 and P for the temperature turn value 830, the faucet 120 would release 100% (or the maximum amount) of water from servo motor 254 and no water for servo motor 252.

In another embodiment, the table shown in FIG. 7 can be divided into a plurality of sections such that a continuous change of water flow from water supply inlet hoses 350 through the servo motors 252, 254 can be achieved as the faucet handle 220 changes location along the spectrum of percentage of water flow 820 and temperature turn value 830. In the shown example, the values have a fixed maximum depending on where the faucet handle 220 is located along the spectrum of percentage of water flow 820. The servo motor 252 or 254 side that the faucet handle 220 is located under has the maximum percentage of water flow 820 for the value for servo motor water inlet 840 or 850 and the other value for servo motor water inlet 840 or 850 is decremented down to zero on the far end depending on how many divisions there are for the temperature turn value 830. In the shown example, there are five divisions and within the first division on each side both of the values for the servo motor water inlets 840, 850 are at the maximum depending on where along the spectrum the faucet handle 220 falls on the percentage of water flow 820. Within the next division, the value for the servo motor water inlet 840 or 850 for the side the faucet handle 220 is located stays the maximum value and the other value for the servo motor water inlet 840 or 850 drops to half of the maximum value. Within the last division, the value for the servo motor water inlet 840 or 850 for the side the faucet handle 220 is located stays the maximum value and the other value for the servo motor water inlet 840 or 850 drops to zero.

In another embodiment, the values for the servo motor water inlets 840, 850 may be decremented in a different way. In another embodiment, the values 840, 850 may be decremented by thirds. The settings for the divisions may be changed depending on user preference. More divisions can result in a more continuous change in water temperature and water flow. The fewer divisions can result in energy conservation since the servo motors 252, 254 will not need to be changed in operation as frequently.

The controller 240 can receive the signals from the sensor PCBA 510 to detect the spatial orientation of the faucet handle 220. The controller 240 can use an algorithm to calculate where in the spectrum of percentage of water flow values 820 and temperature turn values 830 the faucet handle 220 is located from the signals received from the sensor PCBA 510. After crossing a threshold for either percentage of water flow values 820 or temperature turn values 830, the controller 240 can send signals to the flow control box 250 to operate the servo motors 252, 254 to release water of an updated temperature and water flow depending on the spatial orientation of the faucet handle 220.

In another embodiment, the controller 240 can use a look-up table to see what values the controller 240 should set for the values of the servo motor water inlets 840, 850. The controller 240 determines the spatial orientation of the faucet handle 220 and determines which section the faucet handle 220 is located. If the faucet handle 220 located in section number 16 810, then the controller 240 sends a signal to the flow control box 250 to close the water supply inlet hose 350 for servo motor 1 252 and open the water supply inlet hose 350 for servo motor 2 254 to the maximum in order to achieve the value for servo motor 1 water inlet 840 of 0 and the value for servo motor 2 water inlet 850 of 100.

Figure 9:
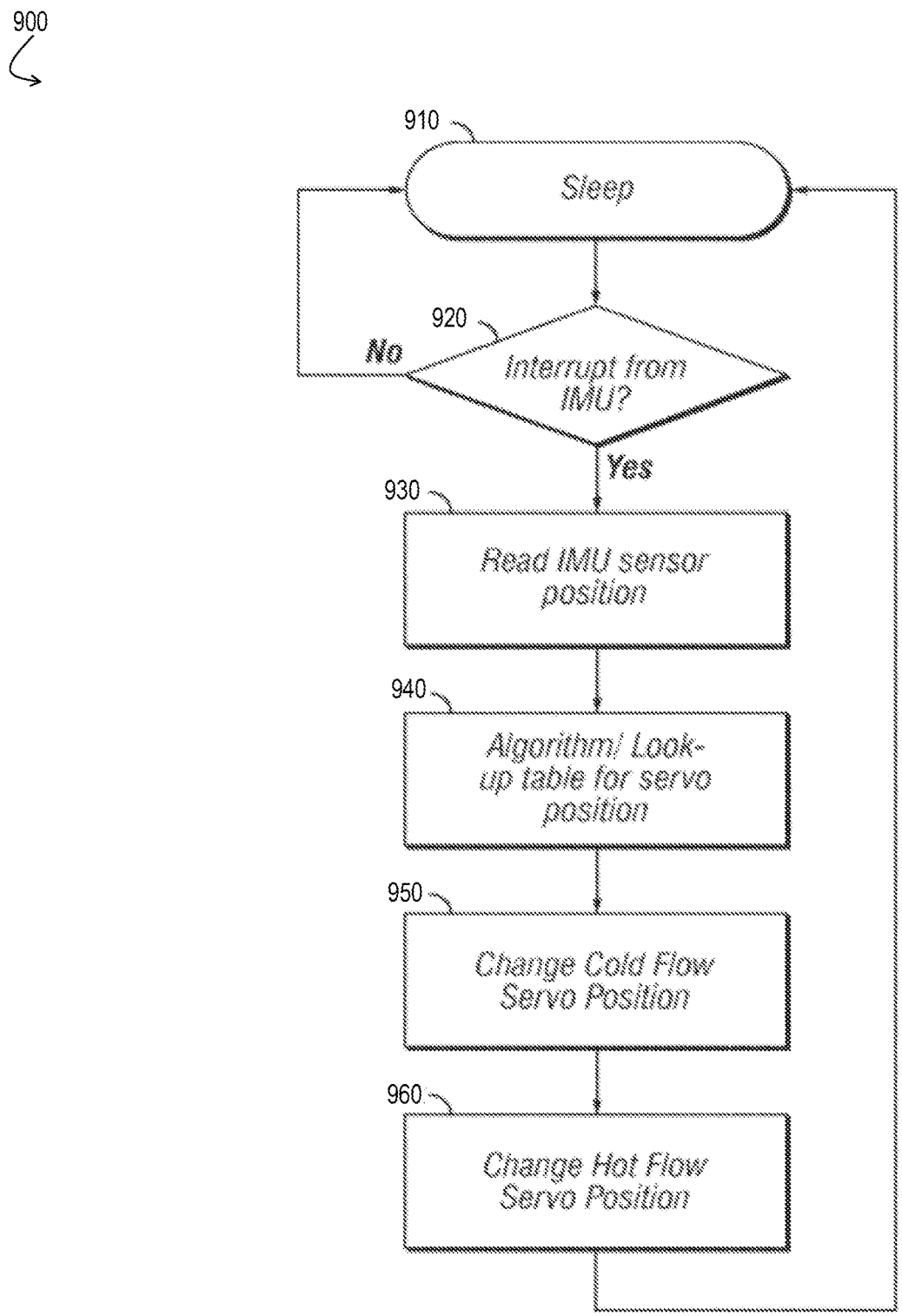
FIG. 9 illustrates a flow chart showing an example operation of the faucet.

FIG. 9 illustrates a flow chart showing an example operation of the faucet 120. In the shown example, the faucet 120 uses an interrupt method 900 of controlling the operation of the flow control box 250. In the shown example, the interrupt method 900 begins with operation 910 in which the controller 240 is in a sleep state to conserve energy waiting to receive an interrupt from the sensor PCBA 510 or inertial motion unit (IMU) sensor 510 or to receive a voice command from a user. After operation 910, the process continues to operation 920 where there is a check for an interrupt from the IMU sensor 510. If there is an interrupt received from the IMU sensor 510, then the process continues to operation 930. If an interrupt is not received, then the process returns to operation 910 for the controller 240 to sleep. In embodiments where the controller has received a voice command from a user rather than a movement in the position of the faucet handle 220, operation 920 is skipped and the process continues to operation 930 upon the controller 240 identifying a control action by itself or receiving a control action from a server 140 or computing device 130 communicatively connected to the faucet 120.

After the process continues to operation 930, the controller 240 will read the IMU sensor 510 position or identified control action to determine the spatial orientation of the faucet handle 220 or identify the prospective spatial orientation of the faucet handle 220 corresponding to the identified control action. After the controller 240 reads the IMU sensor 510 or identified control action, the process continues to operation 940 where the controller 240 will use an algorithm to calculate the servo motor 252, 254 positions or look-up table for the servo motor 252, 254 positions according to the determined spatial orientation of the faucet handle. After the controller 240 determines the servo motor 252, 254 positions, the process continues to operation 950 where the controller 240 sends a signal to the flow control box 250 to change the servo motor 252 or 254 position to change the cold water value being released through pull down hose 340 to spray head 320. After the servo motor 252 or 254 position is changed, the process continues to operation 960 where the controller 240 sends a signal to the flow control box 250 to change the servo motor 252 or 254 position to change the hot water value being released through pull down hose 340 to spray head 320. After both servo motor 252, 254 positions are updated, the process returns to operation 910. In another embodiment, the hot water value may be changed first before the cold water value and so the corresponding servo motor 252 or 254 would change.

In another embodiment, the controller 240 may further wait for another interrupt after receiving an initial interrupt from the IMU sensor 510 or another voice command to update the positions of the servo motors 252 or 254. The delay can be to wait for the final position the user intends to position the faucet handle 220. The delay may be a set predetermined period of time for the controller 240 to wait to receive additional interrupts. Therefore, the faucet 120 would only need to go through the process once instead of multiple times depending on how many sections the faucet handle 220 crosses.

Figure 10:
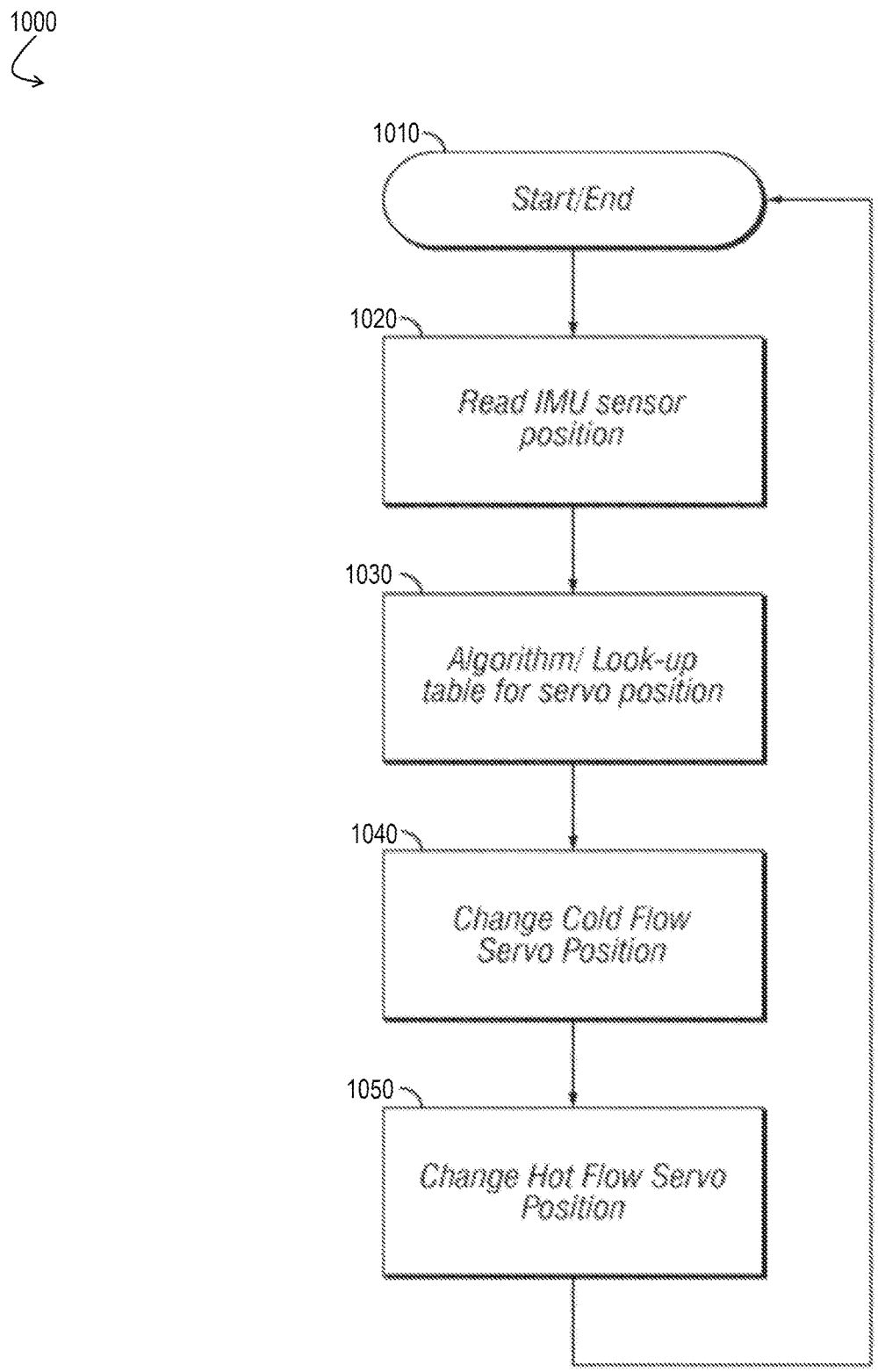
FIG. 10 illustrates a flow chart showing another example operation of the faucet.

FIG. 10 illustrates a flow chart showing an example operation of the faucet 120. In the shown example, the faucet 120 uses a polling method 1000 of controlling the operation of the flow control box 250. In the shown example, the polling method 1000 begins with operation 1010 in which the controller 240 starts and turns on. After the controller 240 is on, the process continues to operation 1020 where the controller 240 reads the IMU sensor 510 position to determine the spatial orientation of the faucet handle 220 and/or checks to see if any voice command has been issued. After the controller 240 reads the IMU sensor 510, the process continues to operation 1030 where the controller 240 will use an algorithm to calculate the servo motor 252, 254 positions or look-up table for the servo motor 252, 254 positions according to the determined spatial orientation of the faucet handle 220 or identified control action. After the controller 240 determines the servo motor 252, 254 positions, the process continues to operation 1040 where the controller 240 sends a signal to the flow control box 250 to change the servo motor 252 or 254 position to change the cold water value being released through pull down hose 340 to spray head 320. After the servo motor 252 or 254 position is changed, the process continues to operation 1050 where the controller 240 sends a signal to the flow control box 250 to change the servo motor 252 or 254 position to change the hot water value being released through pull down hose 340 to spray head 320. After both servo motor 252, 254 positions are updated, the process returns to operation 1010. In another embodiment, the hot water value may be changed first before the cold water value and so the corresponding servo motor 252 or 254 would change.

The polling method 1000 can allow for a more continuous change in water flow and temperature than the interrupt method 900 because there is not a wait for an interrupt by the IMU sensor 510. However, the polling method 1000 expends more energy by constantly updating the process. In one embodiment, the user can set the method of operation for the faucet 120. For example, there may be a switch (not shown) that can be used to change the method of operation for the faucet 120.

Figure 11A:
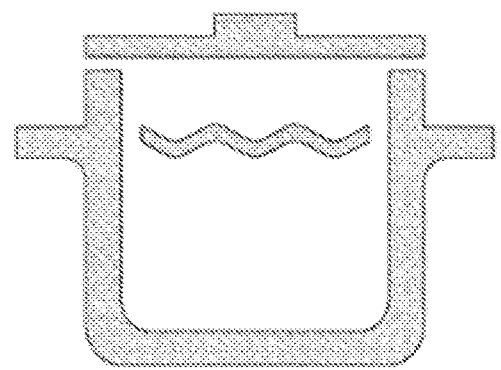
FIGS. 11A-11D illustrate example icons for use with the faucet.
Figure 11B:
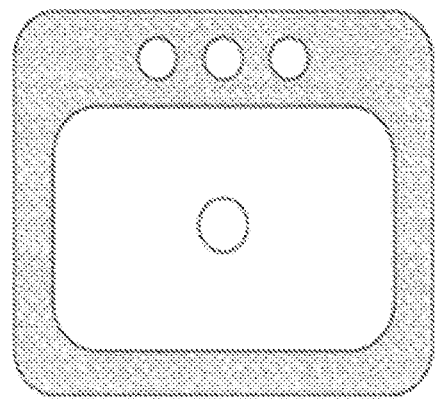
Figure 11C:
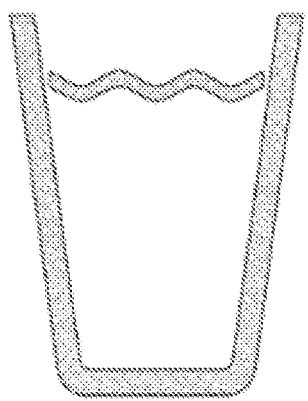
Figure 11D:
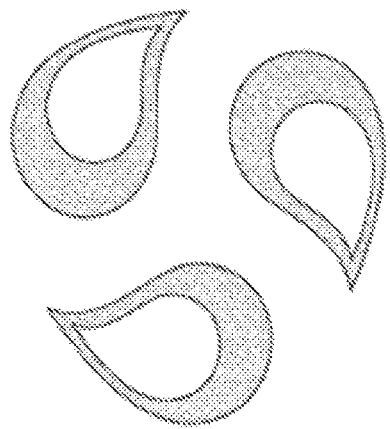

FIGS. 11A, 11B, 11C, and 11D illustrate example icons for use with the faucet 120 according to an embodiment of the disclosure. FIG. 11A illustrates an example pot icon. In some embodiments, the interface 360 may display the pot icon of FIG. 11A when the faucet 120 receives a command to fill a pot. For example, the faucet 120 may receive a voice command, such as "Faucet, fill 6 quart pot," and the interface may illuminate to display the pot icon after receipt of the command and/or during operation of the faucet. FIG. 11B illustrates an example sink icon that may be displayed by interface 360 after receiving a command (e.g., "Faucet, fill sink") or during operation. FIG. 11C illustrates an example cup icon that may be displayed by interface 360 after receiving a command (e.g., "Faucet, fill cup" or "Faucet, fill 8 ounces") or during operation. FIG. 11D illustrates an example filter icon that may be displayed by interface 360 after receiving a command (e.g., "Faucet, 8 ounces of filtered water") or during operation.

Figure 12:
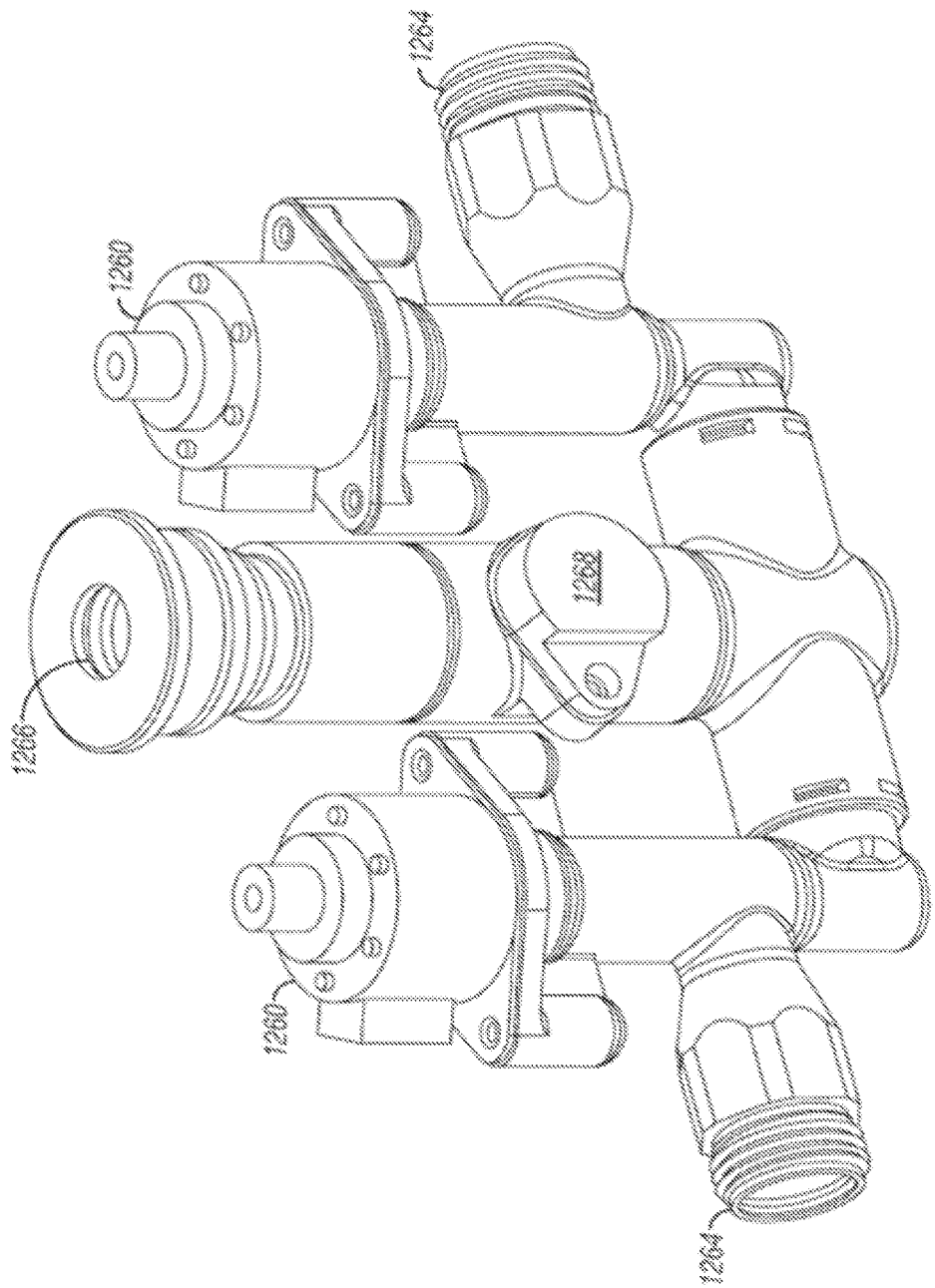
FIG. 12 illustrates a perspective view of some components of a needle valve flow control box.
Figure 13:
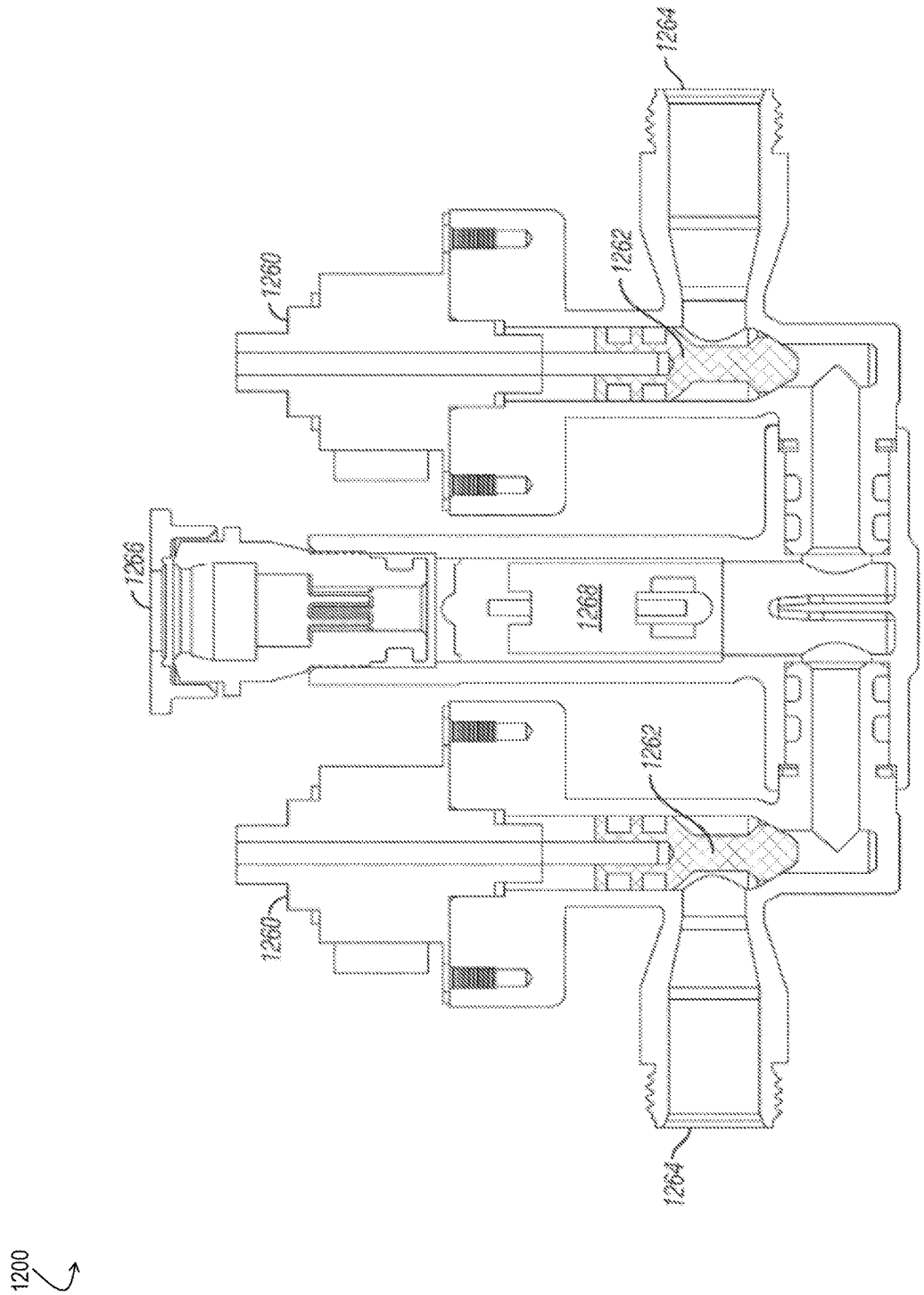
FIG. 13 is a cross-section view of the flow control box of FIG. 12.

FIG. 12 illustrates a perspective view of some components of a needle valve flow control box according to some embodiments. FIG. 13 is a cross-section view of the flow control box of FIG. 12. FIGS. 12 and 13 show some components of a flow control box 1200, including linear stepper motors 1260, needle valves 1262, water supply inlet connections 1264, mixed water outlet connection 1266, and sensor(s) 1268. The flow control box 1200 may be connected to other components, such as control circuitry, networking circuitry, embedded systems, or other components. For example, the linear stepper motors 1260 and the sensor(s) 1268 may be connected to the controller 240, circuitry 230, and/or signal wires 330.

During operation according to some embodiments, hot and cold water supply inlet hoses are connected to the water supply inlet connections 1264. The needle valves 1262 are coupled to the linear stepper motors 1260 such that the linear stepper motors 1260 can move the needle valves to increase or decrease the flow of water to the faucet. Based on the desired water output (e.g., as received from a voice command, a spatial orientation command, a mechanical command), the controller may actuate one or both of the linear stepper motors 1260 which in turn moves the needle valve and in turn increases or decreases the amount of cold or hot water that is provided to the faucet via the mixed water outlet connection 1266.

One or more sensor(s) 1268 may be included with the faucet 120 and/or the flow control box 1200. For example, a flow rate sensor (e.g., a Hall-effect sensor) may be included to meter or determine the amount of water. This may be beneficial if a desired volume of water is needed. For example, a voice-controlled faucet may be able to receive a command such as "Faucet, fill a cup of water" or "Faucet, fill 3 quarts of water" and use the flow rate sensor to dispense that specific volume of water or close to that specific volume of water. Other sensors 1268 may be used as well. For example, the flow control box 1200 may include a temperature sensor. This may be beneficial if a desired temperature of water is needed. For example, the faucet may receive a command such as "Faucet, dispense at 200 degrees" and use the temperature sensor to mix the proper amount of hot and cold water to dispense water at the requested temperature. Similarly, the faucet 120 and flow control box 1200 may work in tandem with other components (e.g., the controller 240, circuitry 230), or with custom or user-defined programming (e.g., IFTTT). For example, the faucet may receive a command such as "Faucet, fill a cup of filtered water for green tea," look-up the correct temperate for steeping green tea (e.g., 175 degrees Fahrenheit), and dispense eight ounces of water at 175 degrees Fahrenheit.

Figure 14A:
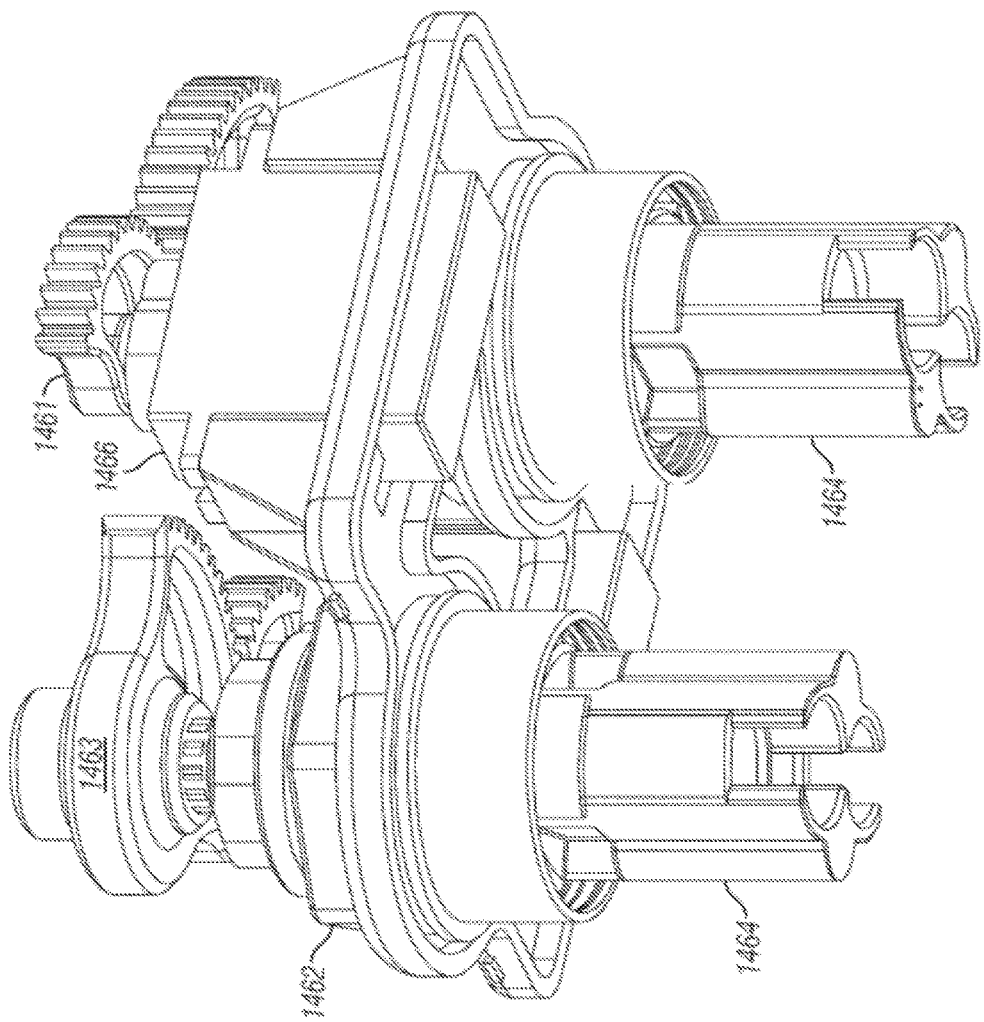
FIGS. 14A, 14B, and 14C illustrate components of an example flow control box with servomotor controls.
Figure 14B:
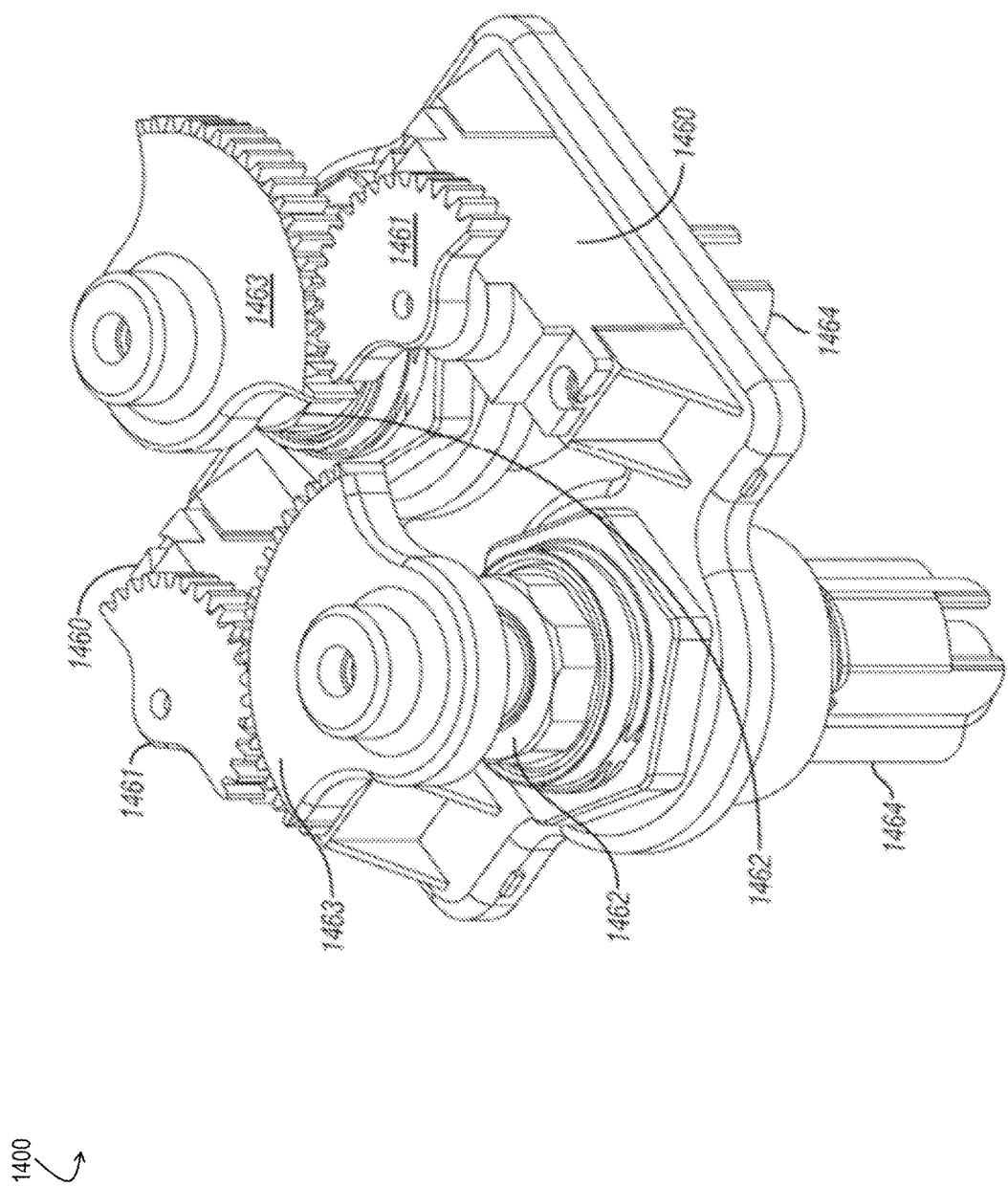
Figure 14C:
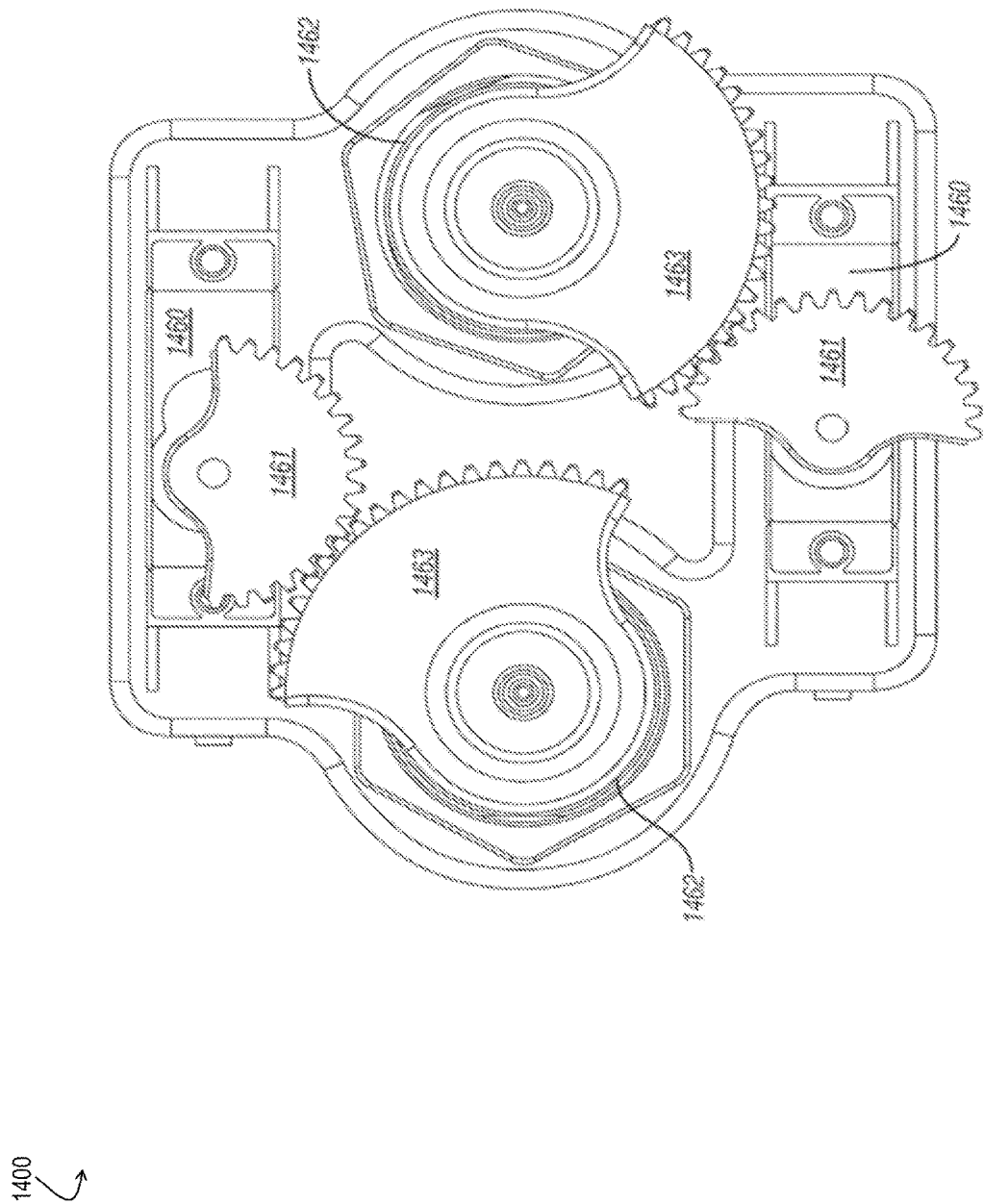

FIGS. 14A, 14B, and 14C illustrate some components of a flow control box 1400 with servomotor controls, according to an example embodiment. FIG. 14AC show some component of a flow control box 1400, including servomotors 1460, servomotor gears 1461, valves 1462, valve gears 1463, and water inlet supply connections 1464. The flow control box 1400 may be connected to other components, such as control circuitry, networking circuitry, embedded systems, sensors, or other components and as described elsewhere for other flow control boxes herein.

Still referring to FIGS. 14A-C, the two servomotors 1260 are coupled to the valves 1262 via the servomotor gears 1461 which are linked to valve respective valve gears 1463. In operation, the servomotors 1260 drive the position of the valves 1262. In some embodiments, the valves 1262 may be cartridge valves. For example, one valve could be connected to a cold supply line and another valve could be connected to a hot water line. Thus, a first servomotor could be used to control flow of cold water and a second servomotor could be used to control flow of hot water. As long as no obstructions or mechanical failures occur, the servomotors 1260 will drive its servomotor gear 1461 (via its output shaft) to the position of the control pulse. Thus, the faucet (e.g., via the controller 240, circuitry 230, or other circuitry) can safely assume the position of the valves 1262. As an added measure of monitoring and to help minimize errors, position feedback may be used such that the servomotors 1260 can monitor the position of its output shaft and thus its servomotor gear. An example of position feedback includes adding a feedback wire to a potentiometer or rotary encoder used with the servomotor drive.

Figure 15:
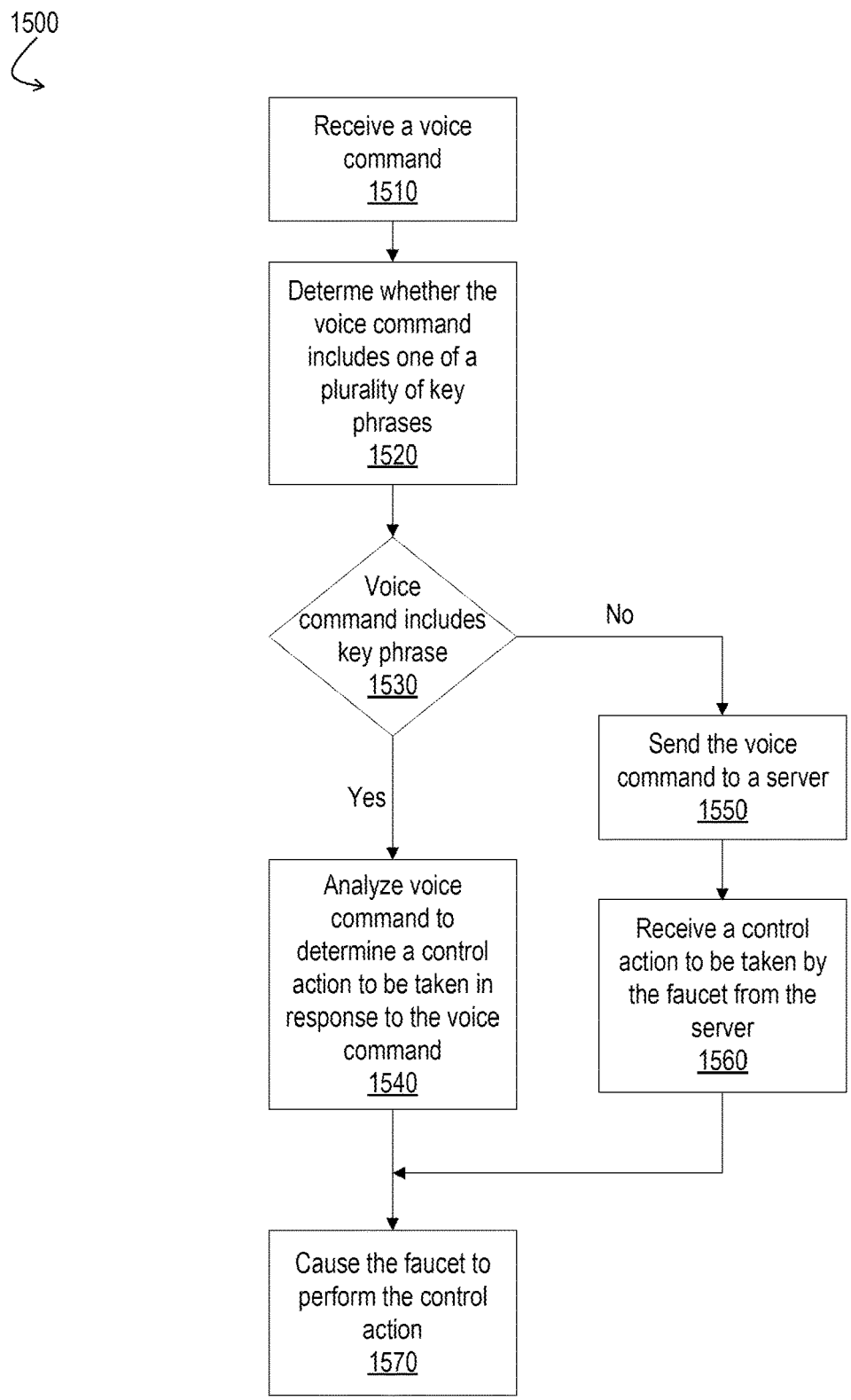
FIG. 15 illustrates a flow chart showing an example method of operation of the faucet.

FIG. 15 illustrates a flow chart showing an example method 1500 of operation of the faucet 120. In the shown example, faucet 120 determines if a voice command needs to be processed locally or if the voice command needs to be processed remotely with the assistance of a computing device 130 or server 140. At operation 1510, the faucet 120 receives a voice command. The faucet 120 may use a microphone 232 or another device capable of receiving commands, wherein the device is embedded in the faucet handle 220 or some other portion of the faucet 120, to receive the voice command.

In some cases, the faucet 120 may be controlled by speaking to it with set voice commands, which may be initiated by a predetermined and recognized voice trigger, such as "Faucet," "Computer," etc. The voice command includes one or more control actions that the user wants the faucet 120 to perform.

At operation 1520, after receiving the voice command, the faucet 120 sends the voice command to a processor 242 located in a controller 240 and communicatively connected to the microphone 232 or another type of processing unit or microcontroller circuit located within the faucet 120 itself. The processing unit helps parse and analyze the received voice command to determine the control action to be taken by the faucet 120. In some embodiments, the voice recognition and processing application may be included as part of the processing unit. In other embodiments, the voice recognition and processing application may be included in a separate processing unit within the faucet 120. When a voice command is received by the microphone associated with the faucet, the voice command is processed locally within the faucet by the voice recognition and processing application to interpret the command. If the voice recognition and processing application embedded within the faucet does not recognize one or more portions of the received voice command or otherwise has trouble interpreting the command, the voice command may be transmitted to the computing device 130 or server 140 for further processing. In some embodiments, the voice command may first be translated to a digital representation of the command by the locally installed voice recognition and processing software before being sent to the computing device 130. In other embodiments, a recording of the voice command as received from the user or an audio signature of the voice command is sent to the computing device 130 or server 140 for further translation or interpretation and processing by a voice recognition and processing application that is available at the computing device 130 or server 140. Other ways of processing the voice command locally or remotely are also possible.

The processing unit determines whether the voice command is a local command or an extensible command by determining if the voice command includes at least one of the predetermined key words or phrases. The processing unit makes the determination of whether the voice command includes at least one of the predetermined key words or phrases by comparing the voice command to a database of voice commands. In some embodiments, the database of voice commands is stored in memory 246.

At operation 1530, a decision is made regarding whether the received voice command includes at least one of the predetermined key phrases. For example, upon comparing the voice command to a database of predetermined voice commands, if the voice command, in full or in part, matches one or more voice commands included in the database of predetermined voice commands, then the voice command is classified as a "local" voice command. Local voice commands are voice commands that may be analyzed locally using the computing resources located within the faucet 120 itself. Once a command is classified as a local command, the command is not sent to remote servers to be analyzed. Analysis related to the command is done within the faucet itself.

Alternatively, if the voice command is not included in the list of voice commands included in the database of voice commands, then the received voice command is not recognized as a "local" voice command and the voice command is classified as an "extensible command." An extensible command is a voice command that can be analyzed remotely using a computing device or server located outside of the faucet 120 and to which the faucet 120 is communicatively connected using networking circuitry 236. If the voice command is classified as a "local" voice command at operation 1530, then operation 1530 is followed by operations 1540 and 1570. If the voice command is instead classified as an "extensible" voice command at operation 1530, then operation 1530 is followed by operations 1550, 1560 and 1570.

At operation 1540, the voice command is analyzed locally to determine the control action that needs to be taken by the faucet 120. The processor 242 located in the faucet controller 240 or a microcontroller circuit located in in the faucet circuitry 230 or some other computing device located within the faucet 120 analyzes the received voice command and compares the voice command to a database of voice commands and associated control actions. In some embodiments, the database of voice commands and associated control actions may be stored in the memory 246 and can be the same as the database of predetermined voice commands discussed above in relation to operation 1530. In other embodiments, the database of voice commands and associated control actions may be different than the database of predetermined voice commands.

Control actions described herein are not meant to be limiting and include, for example, turning the water flow on and off, adjusting the flow, temperature, rate, volume, and duration of water being dispensed by the faucet.

It is noted that the control action examples and voice triggers discussed above are intended as exemplary rather than limiting. For example, in association with faucet actuation control actions, one or more safety action could also be included. For example, in some cases where a control action includes actuating or opening a faucet valve to dispense water, a further control action can be preset to occur, such as to turn off or close the faucet within a predetermined amount of time or based on sensing a condition (e.g., water rising above a predetermined level) detected by sensors surrounding the faucet. Still further, other safety checks can be included in control actions, e.g., to determine a proximity of the user before dispensing water, or to adjust water flow gradually over time, such that a water flow rate tapers off near an end of a dispensing control action.

Alternatively, if the command is determined to be an "extensible" command at operation 1530, then the voice command is sent to a remote computing system 130 or remote server communicatively connected to the faucet 120 in operation 1550. In some examples, the received voice command is locally processed at the faucet 120 using a voice recognition and processing application and the digital representation of the command is sent to the remote computing system 130 or remote server 140. In other examples, the audio signature or a recording of the voice command itself is sent to the computing system 130 or remote server 140 for voice recognition and processing.

In some examples, after the voice command is classified as an "extensible" command in operation 1530, the voice command is transmitted to a computing device 130 communicatively connected to the faucet 120. In some examples, the computing device 130 may be communicatively connected to a server 140 and the voice command received by the computing device 130 may be subsequently sent to the server 140 for analysis. In other examples, the voice command may be transmitted from the faucet 120 directly to the server 140. The server 140 determines the control action to be taken by the faucet 120 based on a comparison of the voice command to a database of recognized voice commands that is stored in the server of another computing device or server that is communicatively connected to server 140.

At operation 1560, the server 140 sends, and the faucet 120 receives, the identified control action to be performed by the faucet 120 directly or via the computing device 130.

At operation 1570, the processor 242 causes one or more components of the faucet 120 to perform the control action. The control action to be performed by the faucet 120 is either determined locally within the processor 242 itself in case of "local" commands or is received from a remote computing system 130 or server 140 in case of an "extensible" command as further described in relation to operations 1520 to 1560. For example, the processor 242 may transmit electronic signals to the flow control box 250 to control the flow volume and temperature of water being dispensed from the faucet 120 based on the identified control action. In some examples, the controller 240 is configured to receive input from one or more sensors integrated within the faucet 120 and adjust the flow volume and temperature of the water based on the control action and input from the sensors. The operations of the controller 240 and flow control box 250 in dispensing water is discussed in further detail in relation to FIGS. 9-10 and 12-14.

Figure 16:
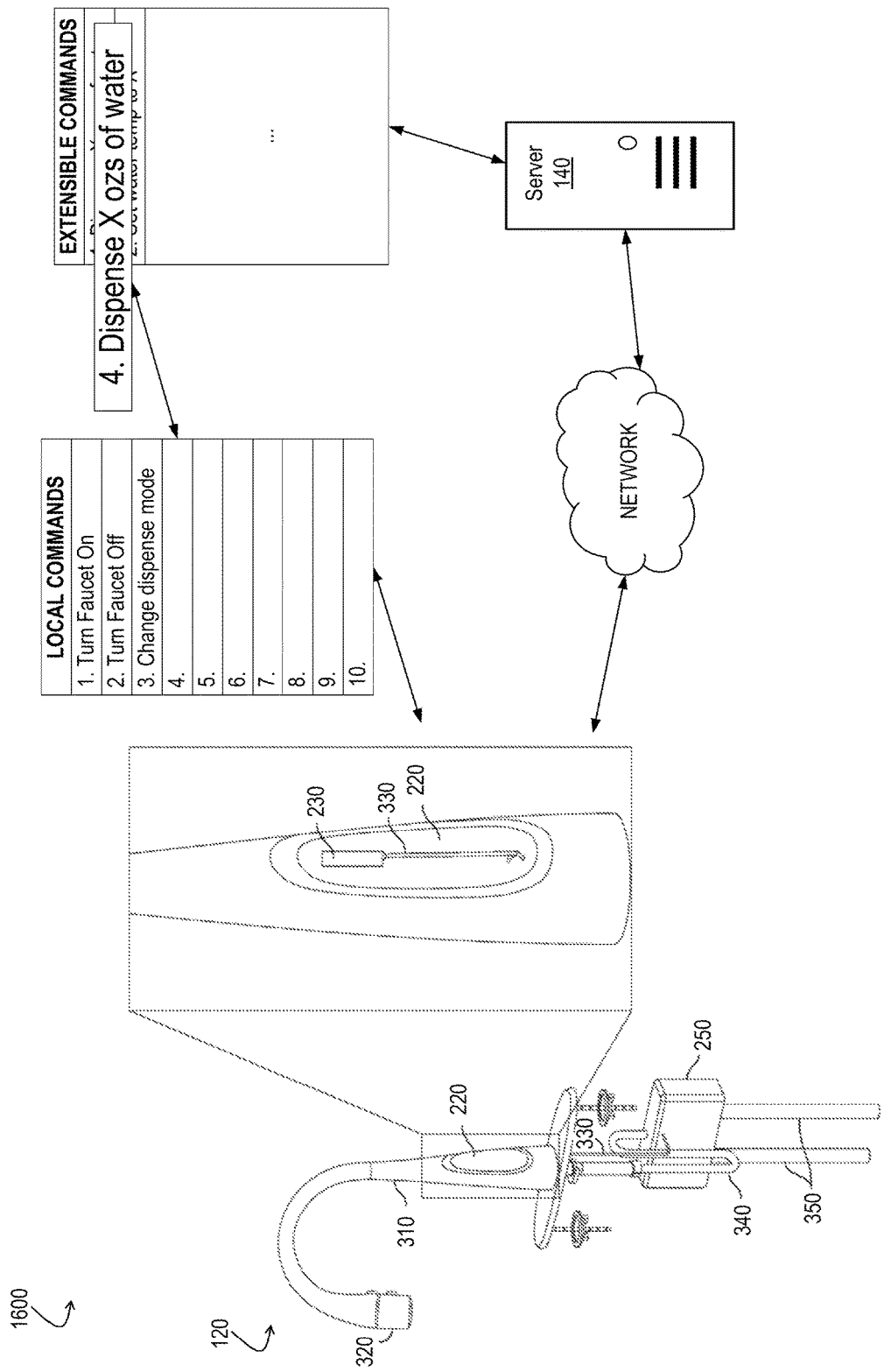
FIG. 16 illustrates a perspective view of an example smart electronic faucet system.

FIG. 16 illustrates a perspective view of an example smart electronic faucet system 1600. In some embodiments, the faucet 120 includes space to save a fixed number of local commands. For example, FIG. 16 shows that up to ten local commands can be stored within the faucet 120 itself. Other examples may allow for more or less number of commands to be stored locally depending on the memory space and processing power of the processing unit embedded within the faucet 120. Typically commands that are used often and commands that need to be executed without significant time delays are the commands that are stored locally. Other commands may be stored remotely in server 140 and connected to the faucet 120 through a network connection. Accordingly, the memory space in the faucet may be maintained with limited capacity, and extensible commands may be provided to the faucet 120 by accessing such commands from the server 140.

In some examples, one or more local commands that are time sensitive, such as "turn faucet on" and "turn faucet off," may be locked-in as local commands because these commands require short execution delays and consequently always need to be stored locally. However, other slots within the local command roster may be changed periodically, manually or automatically, depending on the frequency of use of such commands. In other words, extensible commands that are typically stored remotely may be moved to be stored as a local command depending on the frequency of use of the command. For example, if a user dispenses 8 oz of water every time they fill a drinking glass with water, the command "dispense 8 ozs of water" will presumably be issued multiple times a day, every day. Therefore, even if the command "dispense 8 ozs of water" is initially stored as an extensible command, due to the frequent usage of the command, the command may be moved to the list of local commands.

In one example, the evaluation of whether to re-organize and update the local v. extensible command list may be performed periodically, such as every day or every week, during a time that is less inconvenient to the user. The evaluation and update may be performed automatically by the disclosed system or may be triggered by the user manually. For example, the user may connect to a remote application installed in a personal computer, or smart phone and trigger an evaluation and/or update process. The command may be received by the faucet 120 via networking circuitry 236. Manual commands may include adding to the list of local commands, deleting a command from the list of local commands, moving a command classified as an extensible command to the list of local commands, updating the expected language of the command, and triggering a manual update of the voice analysis software and/or user preferences among other commands.

What is claimed is:

1. A method of controlling water dispensed from a faucet in response to receiving a voice command, the method comprising:
receiving, at the faucet, the voice command associated with an operation of the faucet;
comparing the received voice command to a list of one or more predetermined local commands to determine whether the voice command is one of the one or more predetermined local commands that is to be processed at the faucet for determining a control action, or whether the voice command is not one of the one or more predetermined local commands and is to be communicated to a server for determining the control action remotely; and
upon determining that the received voice command includes at least one of the one or more predetermined local commands:
analyzing the voice command at the faucet to determine the control action to be taken by the faucet in response to the voice command; and
causing the faucet to perform the control action; or
upon determining that the received voice command does not include at least one of the one or more predetermined local commands:
sending the voice command from the faucet to a server communicatively connected to the faucet;
receiving the control action to be taken by the faucet from the server in response to the voice command; and
causing the faucet to perform the control action.

2. The method of claim 1, wherein analyzing the voice command includes:
comparing the voice command to a database of one or more recognized voice commands and associated control actions; and
selecting the control action associated with a recognized voice command from the database of one or more recognized voice commands that matches the received voice command.

3. The method of claim 1, wherein the voice command is received at the faucet using a microphone integrated into the faucet.

4. The method of claim 1, wherein the voice command is analyzed at the faucet using a computing device integrated into the faucet.

5. The method of claim 1, wherein causing the faucet to perform the control action includes causing an electronic flow control system associated with the faucet to adjust a flow of water dispensed from the faucet based on the control action.

6. The method of claim 1, wherein the control action includes one of: turning the faucet on, turning the faucet off, adjusting a flow of water, adjusting a temperature of water, adjusting a volume of water dispensed, and adjusting a duration of water dispensed.

7. The method of claim 1, wherein the voice command is initially sent from the faucet to a computing device communicatively connected to the faucet and subsequently sent from the computing device to the server.

8. The method of claim 1, wherein the faucet and the server are communicatively connected using at least one of: Wi-Fi connection, Bluetooth connection, mesh networking connection, and ZigBee connection.

9. The method of claim 1, wherein the one or more predetermined local commands include commands that are associated with response-time-sensitive control actions.

10. An electronic voice controlled faucet system comprising:
a faucet, including:
a microphone configured to receive a voice command from a user;
an electronic flow control system to adjust a flow of water being dispensed by the faucet; and
a controller including a processor and a memory, the memory storing instructions that when executed by the processor cause the processor to:
receive the voice command from the microphone;

compare the received voice command to a list of one or more predetermined local commands;

upon determining that the received voice command includes at least one of the one or more predetermined local commands:

analyze the received voice command to identify a control action to be taken by the faucet in response to the voice command; and cause the electronic flow control system to adjust the flow of water being dispensed based on the control action associated with the received voice command; and upon determining that the received voice command does not include at least one of the one or more predetermined local commands:

send the received voice command from the faucet to a server;

in response to sending the received voice command from the faucet to the server, receive the control action to be taken by the faucet; and cause the electronic flow control system to perform the control action associated with the received voice command.

11. The electronic voice controlled faucet system of claim 10, further comprising: the server being communicatively connected with the faucet.

12. The electronic voice controlled faucet system of claim 11, wherein the voice command is initially sent from the faucet to an Internet of Things (IoT device) device communicatively connected to the faucet and subsequently sent from the IoT device to the server.

13. The electronic voice controlled faucet system of claim 10, wherein the control action includes one of: turning the faucet on, turning the faucet off, adjusting the flow of water, adjusting a temperature of water, adjusting a volume of water dispensed, and adjusting a duration of water dispensed.

14. The electronic voice controlled faucet system of claim 10, further comprising:

a faucet handle; and an inertial motion unit sensor mounted in the faucet handle to sense spatial orientation of the faucet handle;

wherein the controller is further configured to receive a signal from the inertial motion unit sensor and control the electronic flow control system to adjust the flow of water being dispensed based upon a position of the faucet handle.

15. The electronic voice controlled faucet system of claim 10, wherein the controller is configured to use a look-up table to convert the control action into an electronic signal that is transmitted to the electronic flow control system for adjusting the flow of water.

16. The electronic voice controlled faucet system of claim 10, wherein the electronic flow control system includes at least two servomotors, wherein one of the at least two servomotors is connected to a cold water supply line and another of the at least two servomotors is connected to a hot water supply line.

17. A faucet comprising:

a controller including a processor and a memory, the memory storing instructions that when executed by the processor cause the processor to:

receive a voice command from a user through a microphone embedded within the faucet;

compare the received voice command to a list of one or more predetermined local commands to determine whether the voice command is one of the one or more predetermined local commands that is to be processed at the faucet for determining a control action, or whether the voice command is not one of the one or more predetermined local commands and is to be communicated to a remote server for determining the control action remotely; and upon determining that the received voice command is one of the one or more predetermined local commands:

analyze the received voice command to identify the control action to be taken by the faucet in response to the voice command; and cause an electronic flow control system associated with the faucet to adjust a flow of water being dispensed from the faucet based on the control action associated with received voice command.

18. The faucet of claim 17, further comprising:

upon determining that the received voice command is not one of the one or more predetermined local commands:

send the received voice command from the faucet to the remote server;

in response to sending the received voice command from the faucet to the remote server, receive the control action to be taken by the faucet; and cause the electronic flow control system associated with the faucet to perform the control action associated with the received voice command.

19. The faucet of claim 18, wherein sending the received voice command from the faucet to the remote server includes sending the received voice command to a remote IoT device that then relays the received voice command to the remote server.

* * * * *